(12) United States Patent
Stewart et al.

(10) Patent No.: US 11,455,015 B2
(45) Date of Patent: Sep. 27, 2022

(54) COMPUTING SYSTEM

(71) Applicant: Lenovo (Singapore) Pte. Ltd., Singapore (SG)

(72) Inventors: Aaron Michael Stewart, Raleigh, NC (US); Alden Rose, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/092,300

(22) Filed: Nov. 8, 2020

(65) Prior Publication Data

US 2022/0147098 A1 May 12, 2022

(51) Int. Cl.
| | |
|---|---|
| *G06F 1/16* | (2006.01) |
| *G06F 3/00* | (2006.01) |
| *G06F 3/14* | (2006.01) |
| *G09G 3/3208* | (2016.01) |
| *G06F 1/3218* | (2019.01) |
| *G06F 1/3234* | (2019.01) |

(52) U.S. Cl.
CPC ............ *G06F 1/165* (2013.01); *G06F 1/1624* (2013.01); *G06F 1/3218* (2013.01); *G06F 1/3265* (2013.01); *G06F 3/00* (2013.01); *G06F 3/1423* (2013.01); *G09G 3/3208* (2013.01)

(58) Field of Classification Search
CPC ...... G06F 1/165; G06F 1/1624; G06F 1/3218; G06F 1/3265; G06F 3/00; G06F 3/1423; G09G 3/3208
See application file for complete search history.

(56) References Cited

U.S. PATENT DOCUMENTS

| | | | |
|---|---|---|---|
| 2006/0082518 A1* | 4/2006 | Ram | G06F 3/1446 345/1.1 |
| 2006/0268500 A1* | 11/2006 | Kuhn | G06F 1/1616 361/679.04 |
| 2010/0039764 A1* | 2/2010 | Locker | G06F 1/1669 361/679.29 |
| 2010/0124008 A1* | 5/2010 | Chang | G06F 1/1624 361/679.26 |
| 2011/0143815 A1* | 6/2011 | Inami | H04M 1/0235 455/566 |
| 2014/0327630 A1* | 11/2014 | Burr | G06F 1/3265 345/173 |
| 2018/0188774 A1* | 7/2018 | Ent | G06F 1/1669 |
| 2019/0212901 A1* | 7/2019 | Garrison | G09G 5/12 |
| 2019/0302847 A1* | 10/2019 | Chen | G06F 1/1624 |
| 2020/0073618 A1* | 3/2020 | Huang | G09B 5/02 |
| 2020/0312081 A1* | 10/2020 | Perrow | G07F 17/3216 |

OTHER PUBLICATIONS

Lenovo, ThinkPad W700, W700ds, W701, and W701ds Hardware Maintenance Manual, 2013 (218 pages).

* cited by examiner

*Primary Examiner* — Christopher E Leiby
(74) *Attorney, Agent, or Firm* — Brian J. Pangrle

(57) ABSTRACT

A system can include a processor; memory accessible to the processor; a first display housing that includes a first display, a first display surface and a recess; a second display housing that includes a second display, a second display surface, where the second display housing is translatable at least partially out of the recess to expose at least a portion of the second display surface adjacent to the first display surface; a sensor that generates a position signal for position of the second display; and circuitry that controls rendering of information to the second display based at least in part on the position signal.

17 Claims, 16 Drawing Sheets

COMPUTING SYSTEM

TECHNICAL FIELD

Subject matter disclosed herein generally relates to technology for computing systems.

BACKGROUND

Various types of display devices, display systems, computing systems with a display, etc., can be utilized in various environments.

SUMMARY

A system can include a processor; memory accessible to the processor; a first display housing that includes a first display, a first display surface and a recess; a second display housing that includes a second display, a second display surface, where the second display housing is translatable at least partially out of the recess to expose at least a portion of the second display surface adjacent to the first display surface; a sensor that generates a position signal for position of the second display; and circuitry that controls rendering of information to the second display based at least in part on the position signal. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
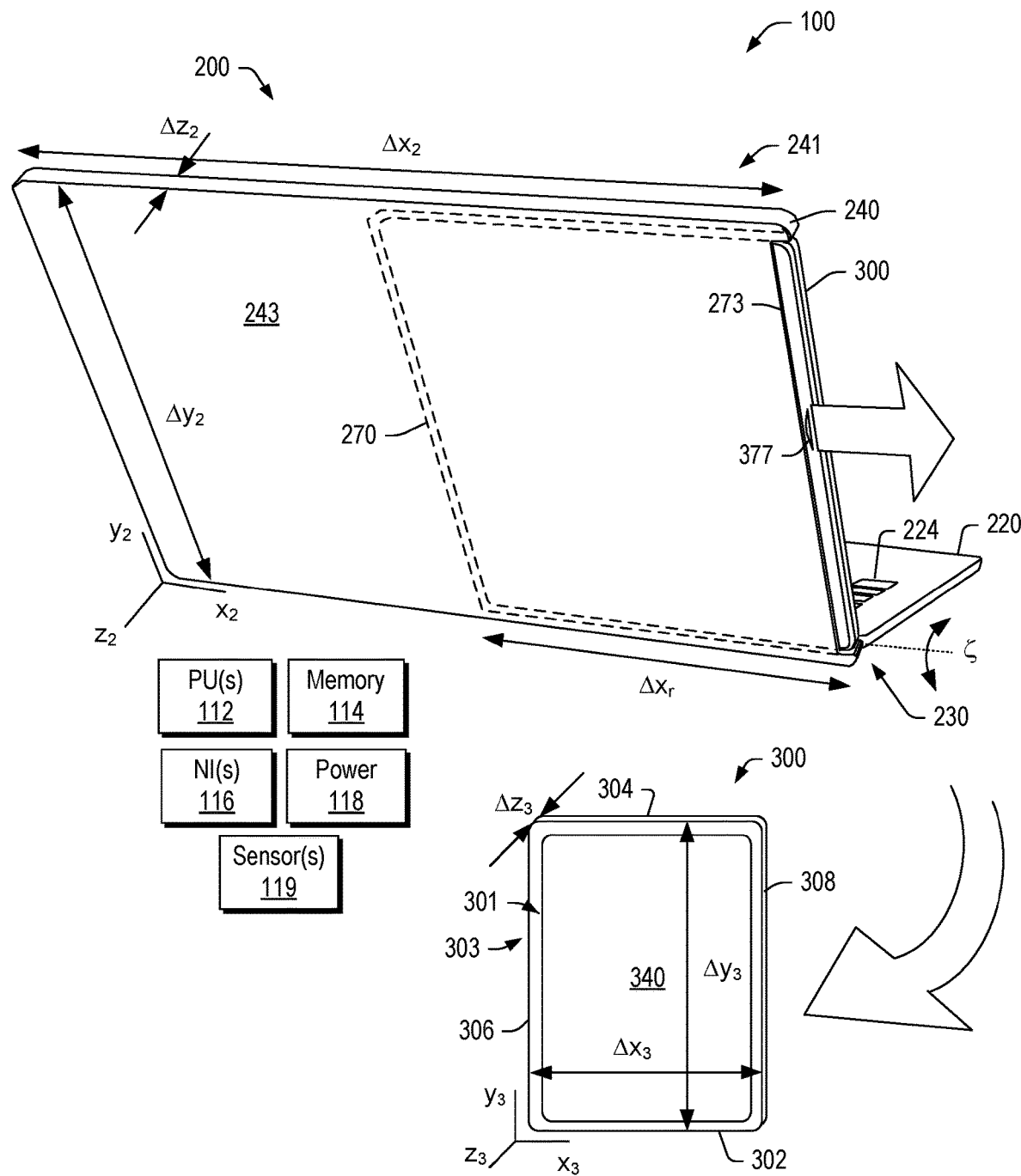
FIG. 1 is a diagram of an example of a system.

FIG. 1 shows an example of a system 100 that includes a tablet computer 300 that includes a display 340 (e.g., a tablet display); and a clamshell computer 200 that includes a keyboard housing 220, a display housing 240, and a hinge assembly 230 that rotatably couples the keyboard housing 220 and the display housing 240, where the display housing 240 includes a display viewable via a display side 241, an opposing back side 243, and a tablet computer recess 270. In the example of FIG. 1, the tablet computer recess 270 is disposed between the display side 241 and the back side 243. As shown in the example of FIG. 1, the tablet computer recess 270 can receive the tablet computer 300 where the tablet computer 300 may be at least partially exposed from the recess 270, for example, to reveal the display 340 of the tablet computer 300.

In the example of FIG. 1, the hinge assembly 230 rotatably couples the keyboard housing 220 and the display housing 240 for rotation about a rotational axis C. For example, rotation may be in a range of angles from approximately 0 degrees (e.g., a closed orientation) to approximately 90 degrees or more (e.g., an open orientation). As an example, rotation may be in a range from approximately 0 degrees to approximately 180 degrees (e.g., a tablet orientation). A hinge assembly may include one or more hinges, one or more axles, one or more leaves, one or more gears, etc. For example, consider a single axle hinge that includes a leaf that couples to the keyboard housing 220 and a leaf that couples to the display housing 240. As another example, consider a multi-axle hinge that can include gears where axles rotate in unison via meshed engagement of gears. As an example, a hinge assembly can include a swivel hinge that allows for swiveling of one housing with respect to another housing. For example, consider a single central hinge assembly that provides for rotation and swiveling. In such an example, the display housing 240 may be swiveled by 180 degrees about a central axis of the central hinge assembly and then rotated to be stacked against the keyboard housing 220, which may be a closed clamshell orientation. In such a closed clamshell orientation, the display side 241 may face outwardly or may face inwardly, for example, toward keys of a keyboard 224 of the keyboard housing 220.

As an example, the system 100 may include one or more processors 112 (e.g., processing units "PUs" or cores), memory 114 (e.g., one or more memory devices), one or more network interfaces 116, one or more power cells 118, and one or more sensors 119. Such components may be, for example, housed in one or more of the keyboard housing 220, the display housing 240, and the tablet computer 300.

As an example, a graphics processing unit (GPU) can be a type of PU or core. A GPU can be an electronic circuit that can include and/or be coupled to memory to accelerate creation of images in a frame buffer intended for output to a display (e.g., rendering to a display). A GPU may be included in a clamshell computer such as the clamshell computer 200 and/or in a tablet computer such as the tablet computer 300. As an example, a device can include GPU present on a video card, embedded on a motherboard, and/or embedded on a central processing unit (e.g., embedded on a CPU die). As an example, a GPU may be operable via one or more application programming interfaces (APIs). As an example, circuitry may utilize one or more APIs for instructing a GPU and/or other circuitry. As an example, consider instructing a GPU and/or other circuitry responsive to a sensor signal (e.g., a position signal) such that appropriate rendering occurs to an exposed portion of a display of a tablet computer received at least in part in a recess of a clamshell computer. Such an example may utilize an API, for example, using one or more API calls to call for appropriate rendering.

In the example of FIG. 1, the tablet computer 300 may be independently operable, for example, for access to one or more networks (e.g., the Internet, etc.) for accessing content and rendering accessed content to the display 340 of the tablet computer 300. The tablet computer 300 can include one or more memory devices, optionally one or more removable memory devices (e.g., consider a memory card that can be removably received by a memory card slot accessible via an outer surface of the tablet computer 300). In such an example, the tablet computer 300 may render content using information stored in a memory device of the tablet computer 300.

The tablet computer 300 can include one or more power cells, such as, for example, one or more rechargeable batteries (e.g., lithium-ion based, etc.). As an example, the clamshell computer 200 may include charging circuitry that provides for charging of a rechargeable battery of the tablet computer 300. In such an example, the charging circuitry may be wired and/or wireless (e.g., consider antenna based charging circuitry, which may adhere to the Qi standard that defines wireless power transfer using inductive charging over distances that may range up to 4 cm or more).

As an example, the tablet computer 300 can include an interface that provides for one or more of power transfer and data transfer with the clamshell computer 200. For example, consider an interface disposed within the tablet computer recess 270 that operatively couples with an interface of the tablet computer 300. As an example, compatible interfaces may operate via wireless transfer of data, for example, consider one or more of WiFi, LiFi, BLUETOOTH, etc. As an example, interfaces may be operatively coupled for various positions of the computer tablet 300 with respect to the clamshell computer 200. As an example, an interface can be along a rail, can include a connector, can include a connector coupled to a cable, etc.

As an example, the computer tablet 300 may render information to the display 340 responsive to receipt of information via one or more interfaces. For example, consider receipt of an email, a network call, a message, an alarm, etc. As an example, such information may be transmitted via the clamshell computer 200 and/or via one or more other devices, systems, etc.

Figure 2:
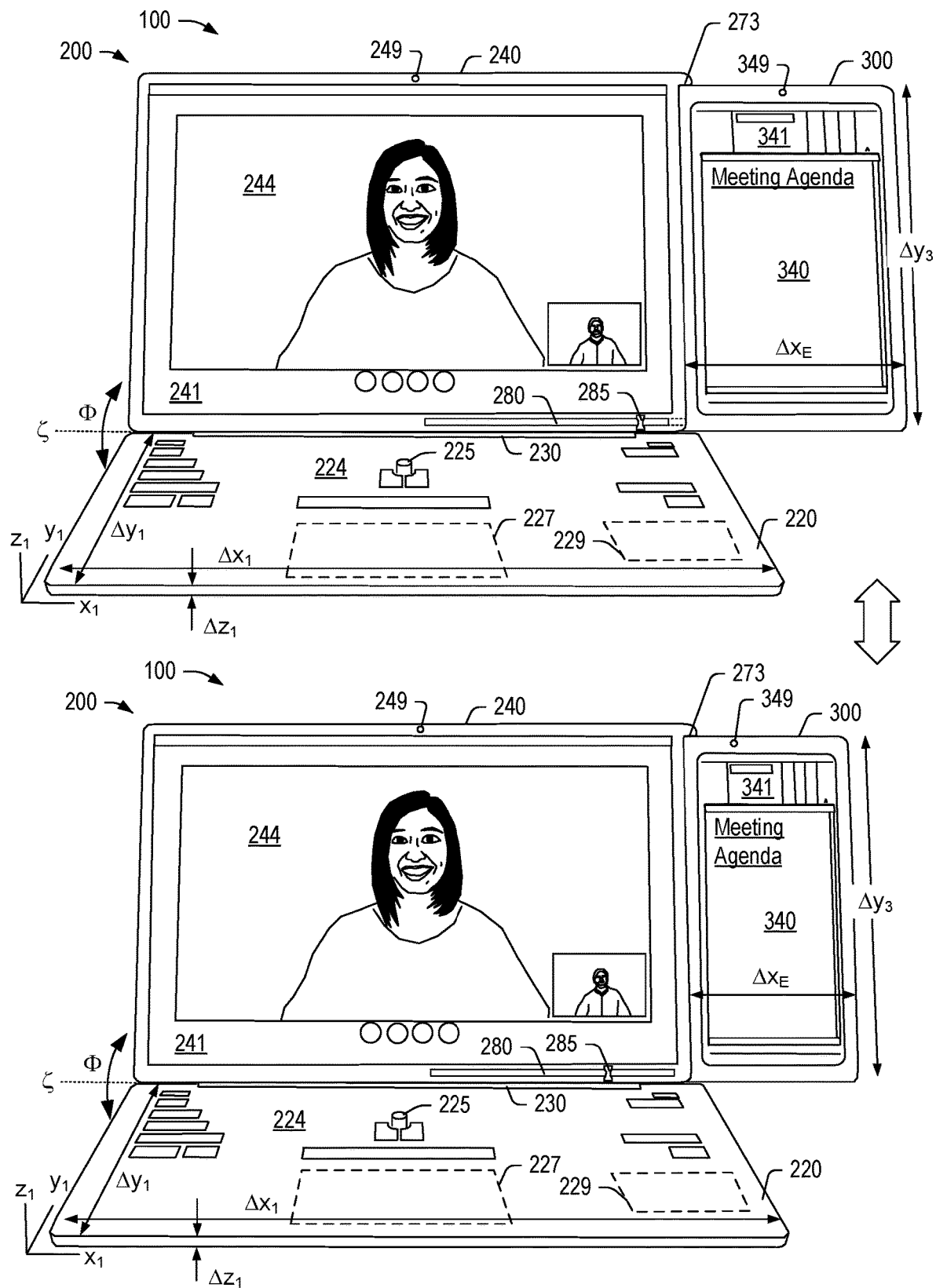
FIG. 2 is a series of diagrams of the system of FIG. 1 and an example of a method.

In the example of FIG. 1, various dimensions are shown with respect to a Cartesian coordinate system $(x_2, y_2, z_2)$ for the display housing 240; noting that a similar Cartesian coordinate system may be utilized for the keyboard housing 220 (see, e.g., Cartesian coordinate system $(x_1, y_1, z_1)$ of FIG. 2). As shown, the axis $x_2$ can be utilized to define a width $\Delta x_2$, the axis $y_2$ can be utilized to define a depth $\Delta y_2$, and the axis $z_2$ can be utilized to define a thickness $\Delta z_2$. The dimensions $\Delta x_2$ and $\Delta y_2$ can define an area, for example, a surface area of the back side 243 of the display housing 240 (e.g., $a_2 = \Delta x_2 * \Delta y_2$).

In the example of FIG. 1, the tablet computer 300 is shown as including a front side 301 where the display 340 is on the front side 301, a back side 303, and edges 302, 304, 306 and 308. As shown, the tablet computer 300 can be substantially rectangular such that the edges 302, 304, 306 and 308 form four corners. The rectangular shape may be square or, for example, the edges 306 and 308 may be longer than the edges 302 and 304 such that the display 340 may be in a portrait orientation or a landscape orientation. For example, in FIG. 1, the table computer 300 is shown as being in a portrait orientation in the recess 270 and out of the recess 270.

As to the tablet computer 300, FIG. 1 also shows various dimensions with respect to a Cartesian coordinate system $(x_3, y_3, z_3)$. As shown, the axis $x_3$ can be utilized to define a width $\Delta x_3$, the axis $y_3$ can be utilized to define a height or a depth $\Delta y_3$, and the axis $z_3$ can be utilized to define a thickness $\Delta z_3$. The dimensions $\Delta x_3$ and $\Delta y_3$ can define an area, for example, a surface area of the front side 301 and/or the back side 303. As shown, the display area of the display 340 may be approximately the same as the area of the front side 301; noting that a bezel may exist that is a border between the display area and one or more of the edges 302, 304, 306 and 308. As an example, an area of the tablet computer 300, which may be considered a footprint, may be determined as $a_3 = \Delta x_3 * \Delta y_3$. Also, a volume of the tablet computer 300 may be determined as $V_3 = \Delta x_3 * \Delta y_3 * \Delta z_3$. In the example of FIG. 1, the recess 270 can have a volume that is sufficient to accommodate the tablet computer 300, optionally with one of the edges 306 or 308 exposed, which may facilitate user contact to move and position the tablet computer 300.

As shown in FIG. 1, the recess 270 can be defined in part by a width $\Delta x_r$, which is less than $\Delta x_2$. As shown, a portion of the tablet computer 300 may be exposed when received in the recess 270, which may facilitate removal of the tablet computer 300. For example, consider an exposed portion that can be at an edge or other portion where a user may utilize a finger, a fingertip, a fingernail, etc., to translate the tablet computer 300 at least partially out of the recess 270. In the example of FIG. 1, the tablet computer 300 is shown as optionally including a groove 377, which may be exposed when the tablet computer 300 is in a stored state in the tablet computer recess 270. As an example, an opening in the back side 243 may provide for access to the groove 377 or another feature that can allow a user to touch and translate the tablet computer 300. As another example, the display housing 240 may include a mechanical, spring-loaded, electrical, magnetic, etc., mechanism that can facilitate storing and removing the tablet computer 300. As an example, a push to eject type of mechanism may be utilized where a user may push one of the edges of the tablet computer 300 to translate the tablet computer 300 slightly inwardly to release a spring-loaded pusher that causes the tablet computer 300 to translate outwardly. In such an example, a latch may be released where the latch acts to retain the tablet computer 300 in the tablet computer recess 270 when in a stored state (e.g., consider a push-push mechanism of a ball point pen, a cabinet door, etc.).

As mentioned, one or more magnets may be utilized to provide a magnetic attraction force, which may act to retain the tablet computer 300 in the tablet computer recess 270. In such an example, the magnetic attraction force may be overcome, for example, via a user contacting a portion of the tablet computer 300 to translate it outwardly from the tablet computer recess 270. As an example, a system may include magnets that can provide for attraction and/or repulsion. For example, consider a system that includes predefined and/or definable positions. In such an example, magnets may repel to help position a tablet computer in one of the predefined or definable positions. As to a definable position, consider movable magnets that can be adjusted to define a position. For example, the tablet computer 300 may include one or more movably positionable magnets along an edge and/or a side that can be positioned such that a user can define a position that can correspond to, for example, an aspect ratio, an area, etc., of an exposed portion of the display 340. In such an example, a magnet or magnets may be disposed in a track for translation along the track with frictional and/or magnet force that maintains a magnet in a desired position.

As an example, the tablet computer recess 270 can include one or more guides (e.g., a rail, a slot, a track, a channel, a ridge, etc.) that can guide an edge or edges of the tablet computer 300 for translation into and out of the tablet computer recess 270. As an example, a guide can be a translation guide for translation of a tablet display device into and out of a recess. As an example, a guide may be a slot that can provide an interference fit with a portion of the tablet computer 300. In such an example, the interference fit can provide a frictional force that can overcome a gravitation force of a mass of the tablet computer 300. For example, if the display housing 240 is oriented with an open side 273 of the tablet computer recess 270 downwardly in a direction of the acceleration of gravity, a force can act upon the tablet computer 300 that depends on the mass of the tablet computer (e.g., F=mg) where such a force may act to cause the tablet computer 300 to translate downwardly out of the tablet computer recess 270. To avoid undesirable translation, one or more forces may be provided that can be individually or collectively greater than a gravity related force. Such force or forces can include frictional force, magnetic force (e.g., attraction and/or repulsion), mechanical (e.g., a latch, etc.), etc.

As an example, the tablet computer 300 can be a tablet display device, which may be an auxiliary display device that can be movable with respect to the display housing 240. In the example of FIG. 1, the tablet computer recess 270 may be a tablet display recess. As explained, the recess 270 can include the open side 273 as a single open side or may include one or more other open sides. As an example, the recess 270 can be open toward the back such that a guide may be exposed for holding the tablet computer 300. As an example, a recess can be a guide or a guide of a recess that may include one or more features that can provide for adjusting the tablet computer 300. As an example, a recess can be a feature of a back side of a display housing upon which a tablet computer can be received and positioned. As an example, a ridge that extends laterally may define a recess. As an example, magnets may be utilized in combination with a ridge on a display housing such that movement of a tablet computer can be guided along the ridge while being attracted to the display housing.

As an example, the display housing 240 can include a shell, which may be a coated shell, a laminated shell, etc. For example, consider a shell that is formed of a translucent material where a portion of the translucent material is coated with a material that is opaque such that a portion of the shell is not translucent and a portion of the shell is translucent. As to a laminated shell, consider a material that is opaque that is positioned to one or both sides of a translucent material to form a laminated shell that includes a portion of the laminated shell that is opaque and a portion of the laminated shell that is translucent. As an example, a shell may be translucent as made from a translucent material where the translucent material overlays the recess 270, which may define a wall of the recess 270. Where a shell is translucent, various interior components of the display housing 240 may be visible from the back side 243 of the display housing 240.

As an example, a back side of a tablet computer may match a back side of a display housing. For example, in FIG. 1, the back side 243 of the display housing 240 can have a shape where the recess 270 is open and where the tablet computer 300 has the back side 303 with a shape (e.g., contoured, flat, etc.) that can be positioned adjacent to the back side 243 of the display housing 240 to form a relatively continuous surface. As an example, the back side 243 of the display housing 240 and the back side 303 of the tablet computer 300 may be made of a common material and may be of a common color, a common finish, etc. As an example, where the recess is open to the back side (e.g., not covered by the back side 243) and where it is desirable to make the presence of the tablet computer 300 known, the finishes and/or colors of the back side 243 and the back side 303 may be selected to provide contrast. For example, consider the back side 243 being a black color and the back side 303 being a red color or including one or more portions that are red (e.g., a red border, etc.). Such contrasting colors may alert a user to the tablet computer 300 as being a feature of the system 100.

As an example, where the recess 270 is open to the back side, the dashed lines indicating interior features that can define the recess 270 may be represented as solid lines and the solid line representing the open side 273 when viewed from the back side of the system 100 may be deleted. As an example, the groove 377 may be at the same location or at another location, if present, on the back side 303 of the tablet computer 300. As an example, the recess 270 may be open to the top and open to the back side as well as including the open side 273. In such an example, a lower edge of the recess 270 (e.g., a lower recess wall) may be a guide (e.g., a U shaped guide, a magnetically aided L shaped or U shaped guide, etc.) that can help assure that the tablet computer 300 is readily translatable outwardly in the direction of the $x_2$ axis and vice versa.

The system 100 may provide a solution for a user that desires a clamshell computer and a tablet computer, which normally are separate and not physically combinable. The system 100 may allow for transport of two devices that can be physically combinable and physically separable. For example, in a separated state, the clamshell computer 200 may be operable with its own display and the tablet computer 300 may be operable with its own display 340; and, in a combined state, the clamshell computer 200 may be operable with its own display and the tablet computer 300 may be in an operational state that may provide for rendering of information to its display 340 where the display 340 is at least partially exposed from the recess 270.

As an example, the display 340 may render one or more graphical controls, for example, as one or more graphical user interfaces (GUIs). In such an example, a GUI may be for instructing the clamshell computer 200 and/or for instructing the tablet computer 300. As an example, a touch received as input may instruct the tablet computer 300 to communicate an instruction to the clamshell computer 200. For example, consider a shutdown graphic that may cause issuance of an instruction to the tablet computer 300 that causes transmission of an instruction to shut down the clamshell computer 200, which may also provide for shutting down the tablet computer 300 and/or transitioning the tablet computer 200 to a low power state, etc. (e.g., to be in a state that may be listening for network activity and rendering information to the display 340 responsive to detection of certain network activity such as an email, a call, a message, an alarm, etc.).

As explained, the system 100 can provide for storage, transportation, charging, etc., of two separable devices. As an example, each of the devices 200 and 300 can include an associated operating system, which may be of a common type or may be of different types. For example, consider the operating system of the clamshell computer 200 being more complex (e.g., a MICROSOFT WINDOWS OS, an APPLE MAC OS, etc.) than the operating system of the tablet computer 300 (e.g., a net OS, a CHROME OS, etc.). As to processing and memory resources, the clamshell computer 200 may include more capable resources than the tablet computer 300. As an example, the tablet computer 300 may include circuitry that allows it to operate as an extended display, a mobile display, a remote desktop, etc., of the clamshell computer 200. As an example, applications may be installed in the clamshell computer 200 and similar or different applications may be installed in the tablet computer 300.

In the example of FIG. 1, as mentioned, the display housing 240 can be defined by an area and the tablet computer 300 can be defined by an area that is less than the area of the display housing 240. In such an example, the display 340 can be of a lesser area than a dedicated display of the display housing 240 as viewable via the display side 241. While various clamshell computers provide for a tablet orientation, the footprint (e.g., area, size, etc.) does not change, which can be true for a clamshell computer where a display housing is separable from a keyboard housing. In such examples, a user may make a compromise as to size of a so-called convertible clamshell computer where the user may select a smaller size such that the tablet configuration is not too big; whereas, the system 100 of FIG. 1 allows a user to select a desired display size of the clamshell computer 200 where a display size of the tablet computer 300 is less and the footprint of the tablet computer 300 is less than the footprint of the clamshell computer 200.

As explained, the system 100 can be a mixed form-factor system, with the clamshell computer 200 having a clamshell form-factor and the tablet computer 300 having a tablet form-factor, optionally with a thin keyboard, which may be detachable from the tablet computer 300 and storable in the recess 270. As to mass, the tablet computer 300 may be less than 50 percent of a mass of the clamshell computer 200. As an example, the tablet computer 300 may have a mass that is less than 30 percent of a mass of the clamshell computer 200.

As an example, the system 100 can include a clamshell form-factor device that houses a touch sensing and optionally stylus enabled removable display device within a pocket (e.g., a recess) in a display housing of the clamshell form-factor device.

As explained, the removable display device can be docked in the clamshell device (e.g., a host device) and, as desired, slid at least partially out and used, for example, either simultaneously with the host device or independently. As an example, one or more types of interfaces may provide for operatively coupling the clamshell device and the movable display device. For example, wired and/or wireless circuitry. As to wired circuitry consider a serial bus interface such as a USB (e.g., USB-C, etc.) interface, which may provide for transmission of data, power or data and power. As to wireless circuitry, consider, for example, one or more of WiFi, BLUETOOTH, LiFi, Qi, etc., for transmission of one or more of data and power. As to a wired interface, consider, for example, a tablet computer recess that can include a male connector and a tablet computer that can include a female connector such that the tablet computer does not have an exposed, extended connector and such that the male connector is disposed within the tablet computer recess such that it is unlikely to be distracting, caught on some object, etc.

As an example, a tablet computer may include two interfaces such as, for example, two USB interfaces where one may be on one edge and the other on another edge. In such an example, one may be connectable with an interface of a recess and the other may be exposed when the tablet computer is disposed in the recess. For example, the exposed interface may be accessible when the tablet computer is in a stored state such that data, power or data and power may be transmitted to and/or from the tablet computer.

As an example, each of the devices can include dedicated power and compute resources. As an example, a host device can include various features of a laptop with a hardware keyboard (e.g., a touch-typing keyboard with depressible keys, etc.), a friction hinge, and a relatively large display (e.g., 11 inch diagonal to 17 inch diagonal).

As explained, the recess 270 can provide for charging the tablet computer 300. As an example, wireless charging circuitry can be disposed in the keyboard housing 220 such that where the clamshell computer 200 is in a closed clamshell orientation the tablet computer 300 is brought into proximity to the wireless charging circuitry for purposes of charging a rechargeable battery or batteries thereof. In such an example, the display housing 240 may be thinner than if the wireless charging circuitry were disposed in the display housing 240. In such an example, the keyboard housing 220 may include a palm rest portion (e.g., between a front edge and the keyboard 224) that includes a first antenna where a second antenna is disposed in the tablet computer 300 that can be aligned with the first antenna when the clamshell computer 200 is in a closed orientation.

As mentioned, the system 100 may include cellular technology such as one or more cellular network circuits. For example, consider 5G circuitry included in the clamshell computer 200 and/or in the tablet computer 300. Where both include 5G circuitry, such circuitry may be utilized to establish a communication channel, for example, for transfer of data, instructions, etc. As an example, a communication mode may provide for calling of one device by the other device, for example, responsive to movement of the tablet computer 300 with respect to the recess 270. In such an example, a call may be via one or more wired and/or wireless technologies.

As an example, the clamshell computer 200 and the tablet computer 300 may be part of a security system where one depends on the other. For example, the tablet computer 300 may be a dongle that includes security information for booting an operating system (e.g., BIOS, etc.) of the clamshell computer 200. As an example, the tablet computer 300 and the clamshell computer 200 may be leashed such that a loss of communication between the two causes one or both to transition to another state. As an example, where the tablet computer 300 includes one or more motion sensors (e.g., camera, accelerometer, gyroscope, etc.), if motion is sensed, the tablet computer 300 may remain in an active state. For example, consider a user walking to a meeting with the tablet computer 300 in hand and where if communication is lost with the clamshell computer 200, the clamshell computer 200 can enter a secure state, a low power state, etc.

As an example, a system can include a processor; memory accessible to the processor; a first display housing that includes a first display, a first display surface and a recess; a second display housing that includes a second display, a second display surface, where the second display housing is translatable at least partially out of the recess to expose at least a portion of the second display surface adjacent to the first display surface; a sensor that generates a position signal for position of the second display; and circuitry that controls rendering of information to the second display based at least in part on the position signal. For example, consider the system 100 of FIG. 1 as including the one or more processors 112; the memory 114 accessible to at least one of the one or more processors 112; the display housing 240 as a first display housing that includes the recess 270 and a first display with a first display surface; the tablet computer 300 as being a second display housing that includes a second display with a second display surface where the tablet computer 300 is translatable at least partially out of the recess 270 to expose at least a portion of the second display surface (e.g., of the display 340) adjacent to the first display surface; the one or more sensors 119 as including a sensor that generates a position signal for position of the second display; and circuitry that controls rendering of information to the second display based at least in part on the position signal, for example, consider circuitry operatively coupled to at least one of the one or more processors 112 (e.g., display circuitry that can render information to a display responsive to and/or based at least in part on a position signal, etc.).

FIG. 2 shows an example of a method that includes positioning the table computer 300, which can be transitioning the tablet computer 300 from the orientation shown in FIG. 1 by moving the tablet computer 300 with respect to the recess 270. In particular, FIG. 2 shows a dimension $\Delta x_E$, which may be measured in the coordinate system $x_2$, $y_2$ and $z_2$ of the display housing 240 as shown in FIG. 1. For example, if the tablet computer 300 is transitioned from a portrait orientation to a landscape orientation, the dimension $\Delta x_E$ can still be utilized to characterize an exposed portion of the table computer 300, for example, an exposed portion of the display 340 of the tablet computer 300.

As explained, the table computer 300 may be positionable via hand (e.g., manually) using one or more features. In the example of FIG. 2, the display housing 240 can include a guide 280 with a tab 285 where movement of the tab 285 along the guide 280 (e.g., a slot, etc.) may position the tablet computer 300 such that a portion of the display 340 of the tablet computer 300 is exposed. In such an example, the tab 285 can be adjustable within limits of the guide 280 to adjust a dimension such as $\Delta x_E$. As an example, as indicated by dotted lines, the guide 280 may extend to an edge and, for example, the tab 285 may be part of or otherwise attached to the tablet computer 300. In such an example, the tablet computer 300 may be removable to be separated from the display housing 240. As an example, the tab 285 may be a clip that can be clipped onto the tablet computer 300 and, for example, optionally positionable such that the tab 285 can be utilized in a portrait orientation and/or a landscape orientation of the display 340 of the tablet computer 300. For example, with reference to FIG. 1, a tab may be affixed to one or more of the edges 302, 304, 306 and 308 of the tablet computer 300 where once affixed, the tab can be utilized to adjust the tablet computer 300, for example, as may be guided by one or more guides (e.g., one or more slots, etc.).

As an example, a tab may be sized to allow for closing of the clamshell computer 200. For example, a tab may be relatively low in profile such that it allows for orienting the clamshell computer 200 in a closed orientation when the tab is in a guide (e.g., a slot, etc.). As an example, the keyboard housing 220 may include a recess, which may be sufficiently wide to accommodate a tab when the clamshell computer 200 is in a closed orientation.

As an example, a guide such as the guide 280 or another type of guide (e.g., internal and/or external to the recess 270, etc.) may include one or more features to position the tablet computer 300 at a pre-determined exposed distance that corresponds to the dimension $\Delta x_E$. For example, consider one or more indicia as to aspect ratio, distance, etc. As another example, consider one or more notches where a tab may be at least in part seated in one or more of the one or more notches. As an example, a scale with marking may be provided such that a distance (e.g., in mm, cm, inches, aspect ratios, etc.) can be determined for positioning the tablet computer 300 where the distance may correspond to the dimension $\Delta x_E$. As an example, the system 100 may include one or more virtual markers. For example, consider rendering a graphic or graphics to a display, issuing an audio signal via one or more speakers and/or one or more audio outputs, etc. In such an example, a user may be guided in positioning the tablet computer 300 (e.g., visually, haptically, audibly, etc.).

The example of FIG. 2 shows the open side 273 of the recess 270 of the display housing 270, noting that an opening may be on another edge. For example, consider a top edge open end such that the tablet computer 300 can be movable via a top edge of the display housing 240. In such an example, consider a guide positioned vertically rather than horizontally such as the guide 280; noting that center of mass may be kept lower in a horizontal position when compared to a vertical position.

In the example of FIG. 2, an example of a graphical user interface (GUI) 341 is shown where the dimensions (e.g., aspect ratio) of the GUI 341 can be automatically adjusted in a manner that depends on the dimension $\Delta x_E$. For example, a user may move the tablet computer 300 with respect to the recess 270 (e.g., using the tab 285 and/or other feature) where a GUI is automatically resized in a manner that depends on how much of the tablet computer 300 is exposed. Given the portrait orientation of the tablet computer 300 in FIG. 2, the dimension $\Delta y_3$ is constant while the dimension $\Delta x_E$ changes where the change causes resizing of the GUI 341 such that as $\Delta x_E$ get smaller, the aspect ratio changes. In the upper view of FIG. 2, the aspect ratio may be approximately 3:5 (e.g., $\Delta x_E/\Delta y_3=0.6$) while in the lower view of FIG. 2, the aspect ratio may be approximately 10:25 (e.g., $\Delta x_E/\Delta y_3=0.4$). As mentioned, a scale and/or other indicia may be provided to guide a user in selecting a desired portion, which may correspond to a particular aspect ratio suitable for rendering a GUI, GUIs and/or other content. As an example, in the portrait orientations shown in FIG. 2, a feature may provide for positioning of the tablet computer 300 such that a relatively continuous display area is created that can have a particular aspect ratio. Such an aspect ratio may correspond to an aspect ratio suitable for a particular application (e.g., video, gaming, etc.).

As mentioned, FIG. 2 shows a Cartesian coordinate system ($x_1$, $y_1$, $z_1$) of the keyboard housing 220. As shown, the axis $x_1$ can be utilized to define a width $\Delta x_1$, the axis $y_1$ can be utilized to define a depth $\Delta y_1$, and the axis $z_1$ can be utilized to define a thickness $\Delta z_1$. The dimensions $\Delta x_1$ and $\Delta y_1$ can define an area, for example, a surface area of the keyboard housing 220 (e.g., $a_1=\Delta x_1*\Delta y_1$). In the example of FIG. 2, the display housing 240 can be opened to an opening angle $\Phi$ with respect to the keyboard housing 220.

In the example of FIG. 2, the keyboard housing 220 is shown as including one or more of a pointing stick 225, a touchpad 227 and a touchpad 229. As shown, the pointing stick 225 can be a joystick that can be used as a pointing device akin to a mouse, a touchpad, a trackball, etc., where, for example, execution of operating system and/or driver instructions translate manipulations into movements of a pointer, a cursor, etc. As an example, the pointing stick 225 may react to sustained force or strain such that it is an isometric pointing device. For example, the pointing stick 225 may sense applied force by using resistive strain gauges where force can be applied to cause a rendered cursor to move of a display where velocity may depend on the applied force such that increasing pressure causes faster movement.

On a QWERTY keyboard, the pointing stick 225 may be positioned between the G, H and B keys and, for example, one or more control buttons may be positioned between a space bar and a front edge of the keyboard housing 220. For example, consider buttons that can be operated for right-handed or left-handed persons.

As an example, the pointing stick 225, the touchpad 227 and/or the touchpad 229 may be operable to control a single pointer rendered to one or more of the displays 244 and 340 and/or to control multiple pointers where a pointer is rendered to the display 244 and/or where a pointer is rendered to the display 340. As an example, a single pointer may be controlled in a manner such that it can jump from the display 244 to the display 340 and vice versa. In such an example, the display 340 may operate effectively as an extended display (see, e.g., multiple display settings in an operating system such as one of the WINDOWS operating systems, Microsoft Corporation, Redmond, Wash.). As a pointer can be a type of controller that indicates a z-buffer order or other rendering and/or active order, as an example, the system 100 may include two separate pointers such that one controls one or more operations associated with the display 244 and another controls one or more operations associated with the display 340. For example, in an extended display environment, a pointer hover on a GUI rendered to the display 340 may effectively cause that GUI (e.g., underlying application, etc.) to be the active GUI; whereas, if two separate and independent pointers exist, operation of one may or may not affect operation of the other. For example, consider a messenger application GUI being rendered to the display 340 and a POWERPOINT presentation GUI (Microsoft Corporation) being rendered to the display 244 where pointer actions for the messenger application GUI do not disturb the POWERPOINT presentation GUI and vice versa.

As to the one or more touchpads 227 and 229, consider a single touchpad approach that utilizes the touchpad 227 for pointer-based controls for the display 244 and the display 340 and consider a dual touchpad approach that utilizes the touchpad 227 for pointer-based controls for the display 244 and that utilizes the touchpad 229 for pointer-based controls for the display 340. As an example, in the FIG. 2, the touchpad 227 may be utilized to interact with the video GUI rendered to the display 244 and the touchpad 229 may be utilized to interact with the meeting agenda GUI 341 rendered to the display 340. In such an example, execution of video streaming services may proceed in an uninterrupted manner (e.g., reduced risk of glitching, blocking, etc.) when a user interacts with the GUI 341 rendered to the display 340.

As an example, where the clamshell computer 200 establishes an operating system environment that is separate from an operating system environment established by the tablet computer 300, one or more control instructions may be transmitted from interactions with one or more of the pointing stick 225, the touchpad 227 and the touchpad 229 to control the tablet computer 300. For example, consider use of BLUETOOTH circuitry such that one or more of the features of the keyboard housing 220 (e.g., the keyboard 224, the pointing stick 225, the touchpad 227 and/or the touchpad 229) can operate as a BLUETOOTH accessory for the tablet computer 300. As an example, where BLUETOOTH circuitry or other communication circuitry exists, the tablet computer 300 may be, additionally or alternatively, an accessory for the clamshell computer 200. For example, consider using the display 340 as a touchpad for pointer-based control of the clamshell computer 200.

As an example, the touchpad 229 may be of a smaller size that the touchpad 227. As an example, the touchpad 229 may be referred to as an auxiliary touchpad. As explained, the touchpad 229 may be a BLUETOOTH touchpad that can operate as an accessory to the tablet computer 300. In such an example, the touchpad 229 may be paired with the tablet computer 300 in a manner that may be dependent on state of the tablet computer 300 or not. For example, if the tablet computer 300 is in a stored state, the touchpad 229 may be in a deactivated state; whereas, if the tablet computer 300 is positioned such that a portion of the display 340 is exposed, then appropriate pairing may occur such that the touchpad 229 is in an active state for use in pointer-based and/or other control of the tablet computer 300. As an example, where the tablet computer 300 is removable such that it is physically detachable from the clamshell computer 200, there may be one or more options as to whether or not to utilize the touchpad 229. For example, consider a BLUETOOTH pairing control GUI that provides options as to pairing with respect to one or more conditions (e.g., pair when exposed, do not pair when stored, do not pair when separated, etc.). As an example, pairing of circuitry may occur responsive to a transition of one or more of the clamshell computer 200 and/or the tablet computer 300 from one state to another state.

As shown, the tablet computer 300 can be translated in a direction outwardly from the recess 270 of the display housing 240 and can be translated in a direction inwardly into the recess 270 of the display housing 240. In the examples of FIG. 2, the display 340 is at least partially exposed as indicated by the GUI 341 rendered to the display 340 where the dimension $\Delta x_E$ can be utilized to determine an extent to which the display 340 is exposed (e.g., to determine a portion size of the display 340 that is exposed).

In the example of FIG. 2, the display housing 240 is shown from its display side 241 as including a display 244 and the tablet computer 300 is shown from its display side 301, which may include one or more features such as, for example, a camera 349, etc.

In the example of FIG. 2, a user may utilize a large portion of the display 244 or the entire display 244 for an application such as a videoconferencing application where the display 340 may be utilized for rendering of information germane to a videoconference (e.g., meeting agenda, etc.). In such an example, a user can more effectively utilize the display 244 for viewing one or more videoconferencing attendees where video of the user may be captured by a camera 249 of the display housing 240 and/or the camera 349 of the tablet computer 300, if the camera 349 is exposed. In such an example, the user may view the GUI 341 according to a desired aspect ratio (e.g., size, etc.) that can depend on the extent to which the tablet computer 300 is exposed with respect to the recess 270. In such an example, the tablet computer 300 can be held in a steady position by one or more features of the display housing 240 and/or the tablet computer 300. As an example, a guide may provide for stabilization and/or guiding translation of the tablet computer 300. For example, the guide 280 may provide for stabilization and/or guiding translation (e.g. via the tab 285, etc.).

As an example, the system 100 may be utilized for gaming. For example, consider rendering a game scene to the display 244 and rendering game information to the display 340, where the game information may include point indicators, supply indicators, time indicators, adversary information, ally information, etc. As an example, a game may include a feature such as "eyes in the back of the head"

where the display 244 provides a forward view of an environment from the perspective of a player and where the display 340 provides a backward view of the environment from the perspective of the player.

As an example, a GUI may be rendered to the exposed portion of the display 340 of the tablet computer 300 where the GUI may be part of a videoconferencing application that is executable using resources of the clamshell computer 200 and/or the tablet computer 300. In such an example, consider a messaging feature where a messaging GUI is rendered to the exposed portion of the display 340 such that the display area of the display 244 of the display housing 240 is not cluttered and/or disrupted by messaging. As an example, a videoconferencing GUI may include a clock and/or a timer where, for example, a user or users may mark meeting agenda items with times, durations, etc. For example, if an agenda includes three items, one or more users may cause a time stamp to be issued for the beginning and/or the end of discussion and/or presentation of one or more of the three items. If the videoconferencing session is recorded, the recording may include chapter markers that may be generated using time stamps. As an example, where a user desires playing back one or more portions of the videoconference as recorded, a playback GUI may be rendered to an exposed portion of the display 340, which may be a touch-screen display, a stylus-enabled display, etc., that can control rendering of the recording to the display 244. As mentioned, one or more features, as may be included with the keyboard housing 240, such as the pointing stick 225, the touchpad 227 and/or the touchpad 229, may be utilized for one or more purposes.

Figure 3:
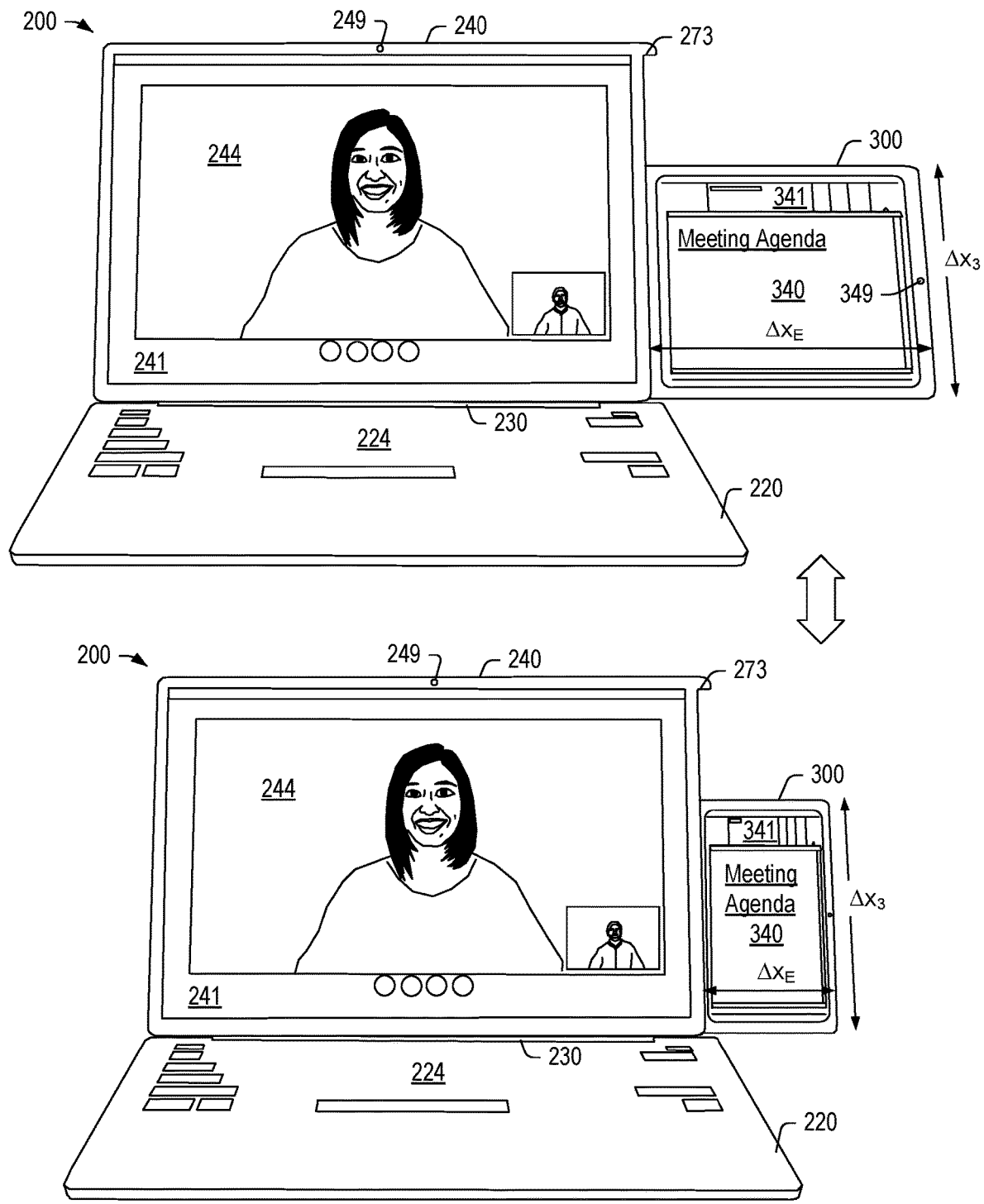
FIG. 3 is a series of diagrams of the system of FIG. 1 and an example of a method.

FIG. 3 shows an example of a method that includes using the clamshell computer 200 along with the tablet computer 300 where the tablet computer 300 is oriented at least in part in the recess 270 with the edge 304 exposed such that the tablet computer 300 is in a landscape orientation rather than a portrait orientation. However, as shown, the tablet computer 300 may be positioned such that the exposed portion of the display 340 forms a portrait type of orientation where the dimension $\Delta x_a$ is greater than the dimension $\Delta x_E$. As shown, the dimension $\Delta x_3$ may be greater than or less than the dimension $\Delta x_E$. As explained, circuitry can provide for automatically resizing and rendering of a GUI, content, etc., responsive to detection of a change in position of the tablet computer 300 with respect to the display housing 240.

Figure 4:
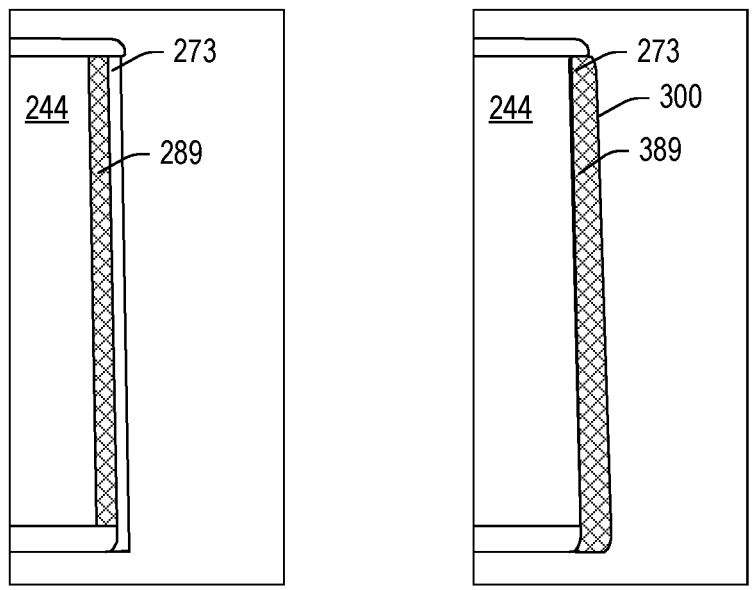
FIG. 4 is a series of diagrams of examples of methods.
Figure 4:
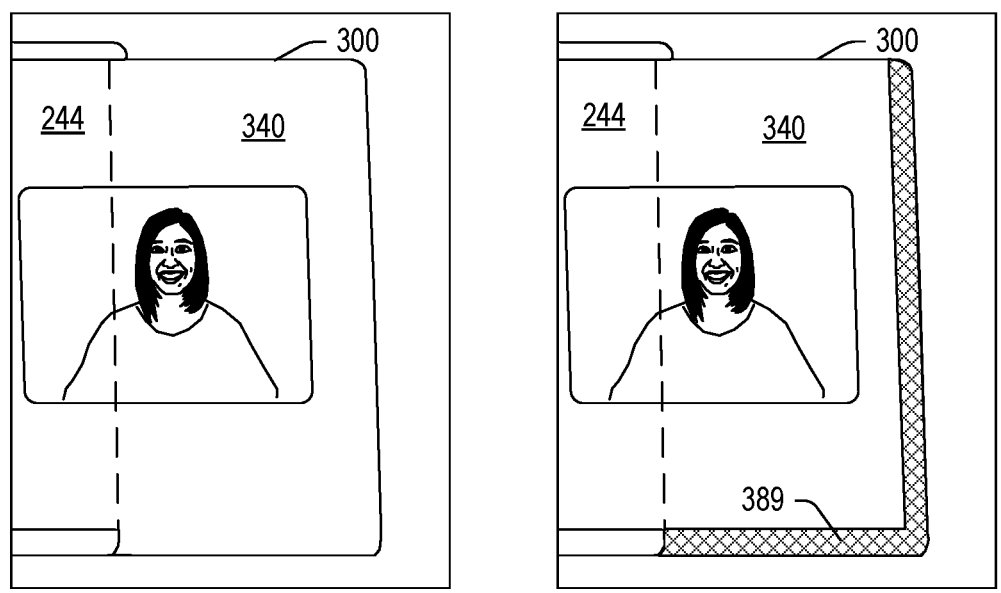

FIG. 4 shows various examples of the display housing 240 and the tablet computer 300 with respect to one or more examples of virtual bezels 289 and 389. For example, the clamshell computer 200 may render the virtual bezel 289 adjacent to the open side 273 to create an impression that there is a continuous bezel about the display 244. In such an example, the virtual bezel 289 may be rendered using data (e.g., vector graphics, visual objects, imagery, etc.) to visually mimic a bezel that runs along at least a portion of the display 244. For example, a bezel may be a black plastic material such that the data once rendered gives a visual appearance of the black plastic material. As another example, a bezel may be made of a polished aluminum material such that data can be rendered to the display 244 that gives a visual appearance of the polished aluminum material. In the example shown with the virtual bezel 289, the tablet computer 300 may be within a recess or removed from a recess. As an example, where the tablet computer 300 is at least in part within a recess and with a portion adjacent to an edge exposed, the tablet computer 300 may render the virtual bezel 389, which may occupy an area of the display 340 of the tablet computer 300 that may be larger than the exposed area as, for example, an edge of the open side 273 may act to provide an effective end of the virtual bezel 389. In such an example, the display 244 may appear to have a continuous bezel, which may be, in part, a virtual bezel per the virtual bezel 389 as rendered to the display 340 of the tablet computer 300.

As shown in FIG. 4, where a continuous display is desired via merging the display 244 and the display 340, circuitry can forego rendering of the virtual bezel. For example, upon translating the tablet computer 300 outwardly from the recess 270, a virtual bezel may automatically disappear such that a continuous display effect is achieved. As an example, the tablet computer 300 may render the virtual bezel 389, which may give a visual appearance of a continuation of a bezel of the display housing 240 when the tablet computer 300 is extended a distance away from the open side 273. For example, upon translating the tablet computer 300 out of the recess 270 to expose a portion of the display 340 (e.g., that is not otherwise exposed), a virtual bezel may effectively shift from being rendered to the display 244 to being rendered to the display 340. In such an example, a user may be provided with an aesthetically balanced experience in that a bezel is present that is in part virtual to frame a display area of a display.

Figure 5:
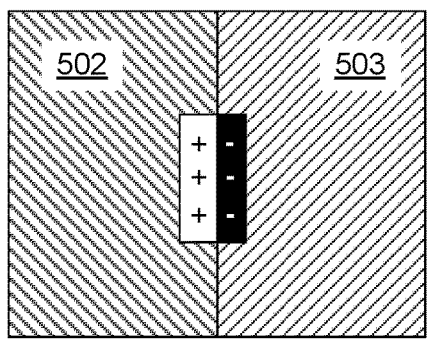
FIG. 5 is a series of diagrams of examples of sensors.
Figure 5:
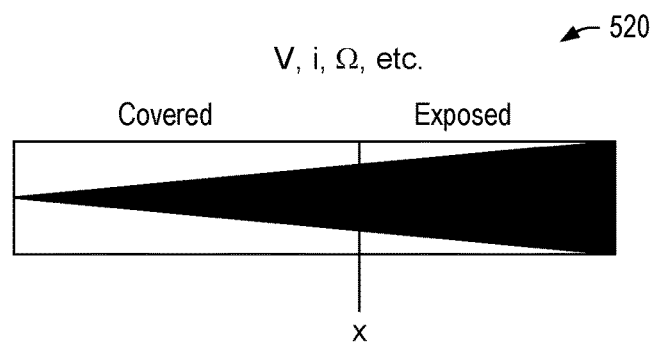
Figure 5:
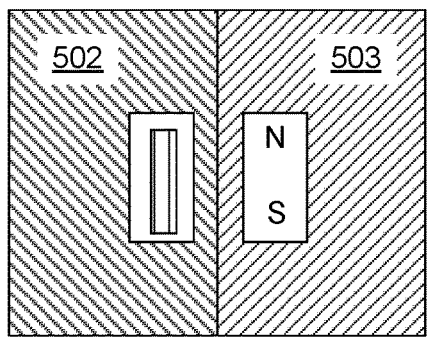
Figure 5:
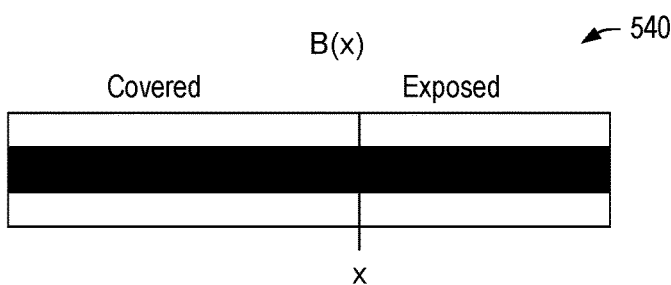
Figure 5:
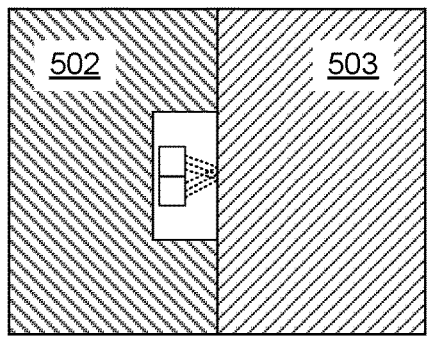
Figure 5:
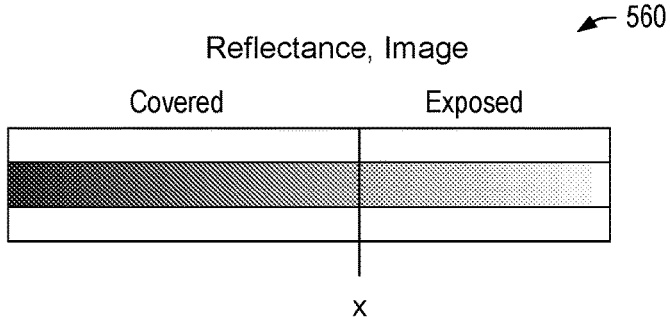
Figure 5:
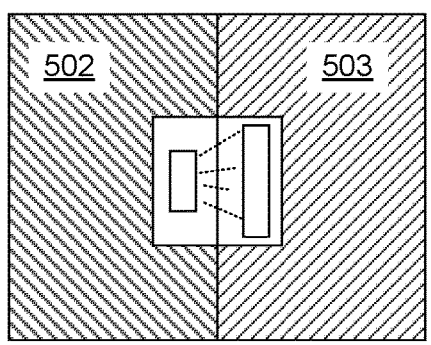
Figure 5:
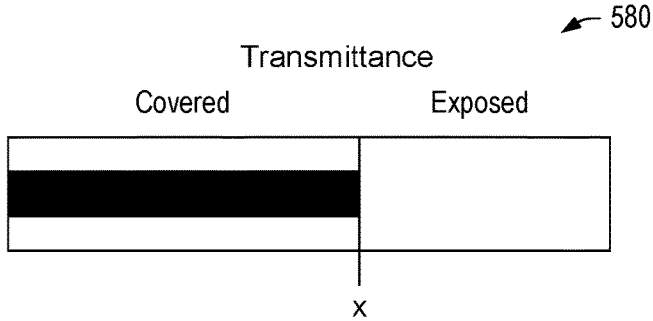

FIG. 5 shows various examples of sensors 520, 540, 560 and 580 that may be utilized in a system. For example, a display housing and a tablet computer can include one or more sensors and/or sensor cooperative features to provide for determining a portion size of a display of the tablet computer that is exposed (e.g., for determining the dimension $\Delta x_E$, etc.). In the examples of FIG. 5, the sensors 520, 540, 560 and 580 are shown with respect to components 502 and 503 where one of the components may be stationary and the other one of the components may be movable. For example, consider the component 502 being a part or portion of the display housing 240 and the component 503 being a part or portion of the tablet computer 300, or vice versa.

In the examples of FIG. 5, the sensors 520, 540, 560 and 580 can generate a signal such as, for example, a position signal. As an example, the one or more sensors 119 of FIG. 1 may include one or more of the sensors 520, 540, 560 and 580 or, for example, one or more other types of sensors.

As an example, a system can include a sensor that generates a position signal for position of a second display, which may be a display of a tablet display device that may be a tablet computer. In such an example, the system can include circuitry that controls rendering of information to the second display based at least in part on the position signal. As explained, a position signal can indicate a position of a display (e.g., a second display) where a portion of the display may be hidden and another portion of the display may be exposed, where the entire display is hidden, or where the entire display is exposed. As explained with respect to FIG. 4, a portion of a display (e.g., a second display) may be exposed in a stored state (e.g., or stored mode) where a virtual bezel may be rendered to at least part of the exposed portion.

The sensor 520 can be an electrical sensor that can sense voltage, current, resistance, etc., such that a value of x may be determined, which may be or relate to the dimension $\Delta x_E$. As an example, the sensor 520 may operate akin to a potentiometer (e.g., a rheostat, etc.) where resistance changes to change a voltage reading. For example, the sensor 520 may be a slide potentiometer where sliding of a portion of the sensor 520 along an x-axis may be utilized to determine x. As shown, a pattern of material, which may be conductive, non-conductive, etc., may change along the x-axis such that positioning of the components 502 and 503 with respect to each other may be determined.

The sensor 540 can be a magnetic sensor that can sense a magnetic field where such sensing may sense one or more of a stationary and a dynamic magnetic field. For example, movement may generate a magnetic field that may vary with respect to time such that a time varying current may be sensed in a coil, etc. As to a static field, consider a magnetic field strength (B(x)) that varies along the x-axis in a predetermined manner such that magnetic field strength can be utilized to determine x. As an example, a Hall-effect sensor (or Hall sensor) may be utilized. Such a sensor can measure the magnitude of a magnetic field where, for example, an output voltage of the sensor is proportional (e.g. directly proportional) to the magnetic field strength through the sensor. The sensor 540 may be utilized to determine a value of x, which may be or relate to the dimension $\Delta x_E$. As shown, B(x) can change along an x-axis such that positioning of the components 502 and 503 with respect to each other may be determined.

The sensor 560 can be a reflectance and/or an image sensor that can sense electromagnetic radiation that is reflected (e.g., as an image or otherwise reflected). For example, a gradient in reflectiveness may be utilized such that reflectivity decreases or increases along the x-axis. As an example, particular patterns may provide for specifically positioning a tablet computer at a desired exposed distance. For example, consider reflective markers that may be spaced along x-axis with non-reflective portions between the markers (e.g., portions of lesser reflectivity). In such an example, reflected energy from an emitter may be received when a position of the tablet computer corresponds to one of the reflective markers, which themselves may differ. In the example sensor 560 shown in FIG. 5, one component includes an emitter and a detector such that emitted energy can be directed away from the emitter such that when a reflector is present on the other component, the detector may sense reflected energy. The sensor 560 may be utilized to determine a value of x, which may be or relate to the dimension $\Delta x_E$. As shown, a pattern may change along an x-axis such that positioning of the components 502 and 503 with respect to each other may be determined. As an example, an emitter-detector pair may be positioned proximate to an open side of a recess of a display housing such that signals can be generated when a tablet computer is at least in part disposed in the recess.

The sensor 580 can be a transmittance sensor where, for example, one or more emitters are positioned in one component and one or more detectors are positioned in another component. As shown in the example of FIG. 5, transmittance may be detected when alignment exists, for example, as for a covered portion; whereas, for an exposed portion alignment may not exist such that a transmittance signal is not generated. The sensor 580 may be utilized to determine a value of x, which may be or relate to the dimension $\Delta x_E$. As shown, a signal can change along an x-axis such that positioning of the components 502 and 503 with respect to each other may be determined.

As an example, one or more of the sensors 520, 540, 560 and 580 may detect absence and/or presence of a tablet computer in a recess. In such an example, the absence and/or presence may relate to a value of x and/or may relate to a state of the tablet computer (e.g., being separated from a display housing, etc.).

As explained, one or more types of sensors may be utilized for sensing position. A position sensor can be a sensor that facilitates measurement of mechanical position. A position sensor may indicate absolute position (e.g., location) and/or relative position (e.g., displacement), in terms of linear travel, rotational angle, or three-dimensional space.

As an example, one or more position sensors may be utilized, which may include one or more of the following technologies, capacitive displacement, eddy-current, Hall-effect, inductive, laser Doppler vibrometer (e.g., optical), linear variable differential transformer (LVDT), photodiode array, piezo-electric transducer (piezo-electric), position encoder (e.g., absolute encoder, incremental encoder, linear encoder, rotary encoder, etc.), potentiometer, proximity sensor (e.g., optical, etc.), string potentiometer (e.g., string pot, string encoder, cable position transducer, etc.), ultrasonic sensor, etc.

Figure 6:
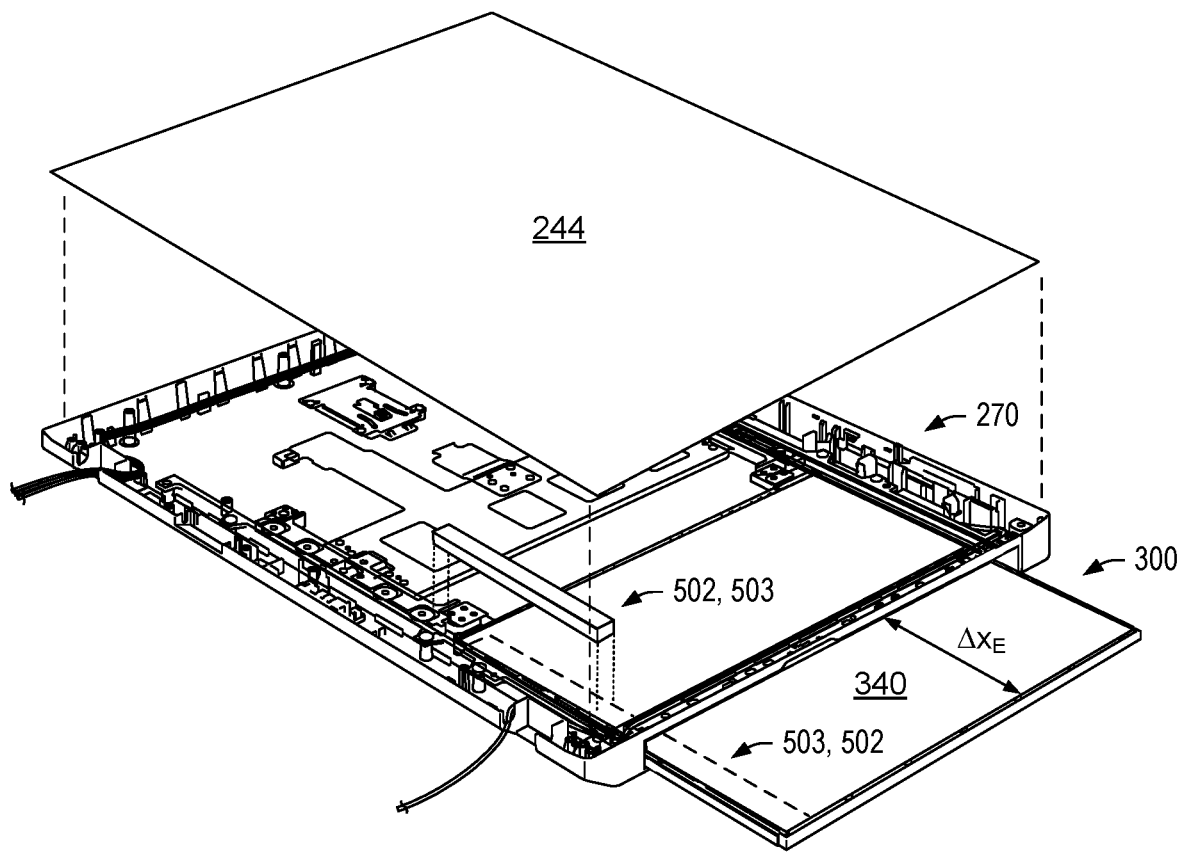
FIG. 6 is a diagram of a portion of an example of a system.

FIG. 6 shows an exploded, perspective view of an example of a portion of the system 100 as including the display 244 and the tablet computer 300, including the display 340. As shown, the tablet computer 300 can be received at least in part in the recess 270. FIG. 6 also shows examples of component regions, for example, corresponding to the components 502 and 503 of FIG. 5. While the component regions illustrated are display side, as an example, one or more component regions may be back side, for example, behind the tablet computer 300 and/or, for example, edge side. As mentioned, a guide and tab approach may be utilized where, for example, a guide may be included in a display housing and a tab included with a tablet computer. As an example, a guide and/or a tab may include one or more sensors, sensor features, etc., for position determinations (e.g., to determine the dimension $\Delta x_E$).

As an example, a sensor may be operatively coupled to a clamshell computer and/or a tablet computer. As explained, a sensor signal may be utilized in one or more operations. For example, consider resizing a GUI and rendering the resized GUI to an exposed portion of a display of a tablet computer. As explained, an operation may include launching an application such that a particular GUI of the application is rendered to a display of a tablet computer when at least a portion, or a particular portion, of the display of the tablet computer is exposed from a recess of a display housing.

As explained, a system can be configurable for use of a second display, optionally in a coordinated manner, with a first display. As explained, such a system may have a form factor such as that of a laptop computer or clamshell computer.

As example, a system can combine a clamshell computer and a tablet computer, which may otherwise be two separate, distinct computers that are not amenable to being readily, physically coupled. As such, a clamshell computer and a separate tablet computer can demand separate storage, transportation and charging features. In various instances, applications may be separate on such two computers such that a user may have to install an appropriate version of an application on a clamshell computer and install another appropriate version of the application on a tablet computer. In such an example, updates to the versions may be required separately, renewals of licenses may be required separately, etc.

As an example, a system can include a clamshell computer and a tablet computer that utilize a single application as may be installed on one of the computers such as, for example, the clamshell computer. For example, consider a casting feature or remote desktop feature that provides GUIs for an application renderable on a display of the tablet computer where the application executes on the clamshell computer. As an example, consider a browser type of experience where the tablet computer can execute a browser application that can receive information from and transmit information to the clamshell computer (e.g., an IP address of the clamshell computer).

As an example, where a user has a cloud-based license for an application, cloud-based resources may be executable via a network connection using the clamshell computer and/or may be executable via a network connection using the tablet computer. As to local storage, a user may utilize memory of the clamshell computer and/or memory of the tablet computer. As an example, a tablet computer may include memory that can be isolated from the clamshell computer such that a "sandbox" is created whereby malicious code (e.g., scripts, etc.) in the memory of the tablet computer cannot readily infect the clamshell computer.

As an example, a system can include a first display and a second display where the second display is adjustable such that a portion of the second display is exposed for viewing where circuitry can automatically render content to the exposed portion of the second display where the content is formatted based at least in part on the size of the portion exposed. In such an example, where a change in the size of the portion occurs, the circuitry can automatically reformat content. In such an approach, certain content that is desired for viewing may be viewable and not hidden when an adjustment to an exposed portion occurs. As an example, a second display may be available for using a sub-set of the full display area.

As an example, a system can be characterized using multiple form factors each form factor is associated with a corresponding display. For example, a system can provide for positioning an auxiliary screen (e.g. an integrated second screen or a separate tablet screen) proximal to a primary screen of a clamshell computer.

As explained, a positionable screen may be docked in a host device or slid out and used either simultaneously with the host device or independently. As an example, a tablet computer may magnetically attach to a display housing of a clamshell computer.

As an example, a system can provide an ability to freely move or adjust a level to which a second screen is extended outward thereby changing the amount of visible screen area and usable portion of a touch sensor. As explained, a pointing stick, a touchpad, touchpads, etc., may be utilized for one or more displays (e.g., display screens, etc.). As an example, a touch-screen or touch-screens may be automatically adjustable as to exposed area, continuous mode, discrete mode, etc. As an example, a system can provide for positioning a second screen in landscape or portrait orientations, at least in part within a storage pocket (e.g., a recess). As an example, a capacitive sensor may operate as a trigger and be disposed at least in part in a storage pocket of a clamshell computer and/or in a tablet computer where, for example, signal logic provides for determining a display area from a sub-set of display areas. In such an example, the determined display area may be utilized for GUI rendering, a touch sensing grid, a stylus grid, etc. As explained, a system can responsively render content and adjust one or more areas for rendering, touch sensing, human input device (HID) interaction, etc. In such an example, an area may be determined at least in part by determining how much of an auxiliary display is exposed adjacent to a primary display. Such an area may be available for one or more of rendering and input, using one or more input devices (e.g., one or more HIDs, etc.).

As an example, a system can include a clamshell computer and a tablet computer where a display of the tablet computer can be in part inserted in a recess in a landscape orientation, for example, with roughly a third of its display area visible. As an example, such a system may provide for inserting a part of the tablet computer in the recess in a portrait orientation, for example, with roughly half of its display area visible. As an example, an adjustment may be made to the tablet computer such that it is inserted to a different amount in the recess while still in a portrait orientation, for example, with roughly a third of its display area visible.

As an example, a system can include a primary display and an auxiliary display where content rendered to the auxiliary display is rendered in a manner responsive to a determination as to an exposed amount of the auxiliary display (e.g., an exposed area).

As an example, a display may be an LED type of display such as an OLED display or another type of LED display. As an example, a display may be drivable according to an exposed area where the exposed area is adjustable by positioning of the display with respect to another display.

As an example, a tablet computer can include one or more accelerometers, gyroscopes, gravity sensors, etc. In such an example, the tablet computer may detect whether it is in a portrait orientation or a landscape orientation. As an example, a display housing can include a recess where one or more sensors can determine whether a tablet computer is received at least in part in the recess in a portrait orientation or a landscape orientation.

As an example, a display housing can include one or more recesses where one or more tablet computers may be stored in the one or more recesses and, for example, at least partially exposed such that a portion of each of the one or more tablet computers is viewable. For example, consider a primary display of a clamshell computer where a display housing of the primary display includes a left recess for a first tablet computer with a first auxiliary display and a right recess for a second tablet computer with a second auxiliary display where the first and second tablet computers can be positionable at least in part to expose at least a portion of the first auxiliary display and/or at least a portion of the second auxiliary display.

As an example, a tablet computer may include communication circuitry that can communicate with a smartphone. In such an example, the tablet computer may be exposed in a manner that replicates an aspect ratio of a display of the smartphone or the entire smartphone (e.g., including its housing). In such an example, the tablet computer may mimic the smartphone and may be a human input device (HID) for the smartphone. In such an example, a user may keep a smartphone in a pocket, a desk drawer, a bag, etc., while being able to interact with the smartphone via the exposed portion of the tablet computer. For example, if the user wants to place a call, the user may expose the tablet computer to a particular extent, which can trigger rendering of a GUI that mimics the smartphone where the user may interact with the GUI using touch input, etc. (e.g., entering numbers, selecting a contact, etc.), to cause the smartphone to place the call. When the call is terminated, the user may slide the tablet computer back into the recess. As an example, in a stored listening mode, the tablet computer may be in the recess, without a portion of its screen exposed, and issue a signal if a call is received by the smartphone. In such an example, a user can be notified that a call has been received and choose to access the smartphone directly or access the smartphone indirectly via the tablet computer (e.g., by positioning the tablet computer). As an example, where a smartphone is mimicked, a camera of the tablet computer, as may be provided and exposed, may be utilized for purposes of a video call.

As an example, a display of a tablet computer and a display of a clamshell computer may be extended in a manner such that a user may drag and drop, move, etc., features rendered to one of the displays to the other one of the displays.

As an example, where a portion of a display of a tablet computer is exposed and a particular application launched (e.g., instantiated, etc.), which may be local and/or remote, the portion of the display may be populated with one or more GUIs. For example, consider selectable tools of a drawing application (e.g., a CAD application), of a photo editing application, contacts of an email application, etc.

As explained, one or more interfaces may be included in a system that can provide for transmission and/or receipt of electrical power and/or data. As an example, an interface may utilize electrical contacts as part of a serial bus standard, pogo-pins, a rail or rails, etc. As mentioned, one or more wired interfaces and/or one or more wireless interfaces may be included in a system.

Figure 7:
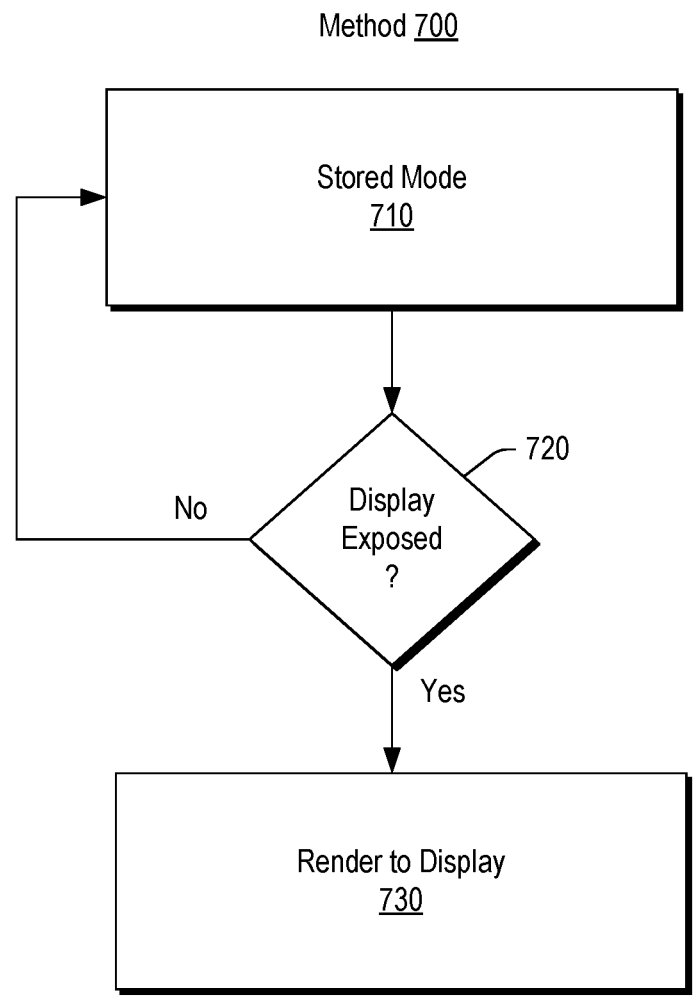
FIG. 7 is a diagram of an example of a method.

FIG. 7 shows an example of a method 700 that includes a storage block 710 for indicating that a tablet display device, which may be a tablet computer, is in a stored mode without a display thereof exposed, a decision block 720 for deciding whether at least a portion of the display is exposed, and a render block 730 for rendering content to an exposed portion of the display where the decision block 720 decides that at least a portion of the display is exposed (see "Yes" branch). As shown, if the decision block 720 decides that at least a portion of the display is not exposed (see "No" branch), then the method 700 may continue to the storage block 710. As an example, the method 700 may be triggered by detection of movement of the tablet display device with respect to a recess in a display housing of another display, which may be a display housing of a clamshell computer.

As an example, output of one or more sensors may be utilized in a method such as the method 700. For example, such output can be utilized by circuitry to determine one or more of whether a portion is exposed, how much of a portion is exposed and orientation of an exposed portion.

Figure 8:
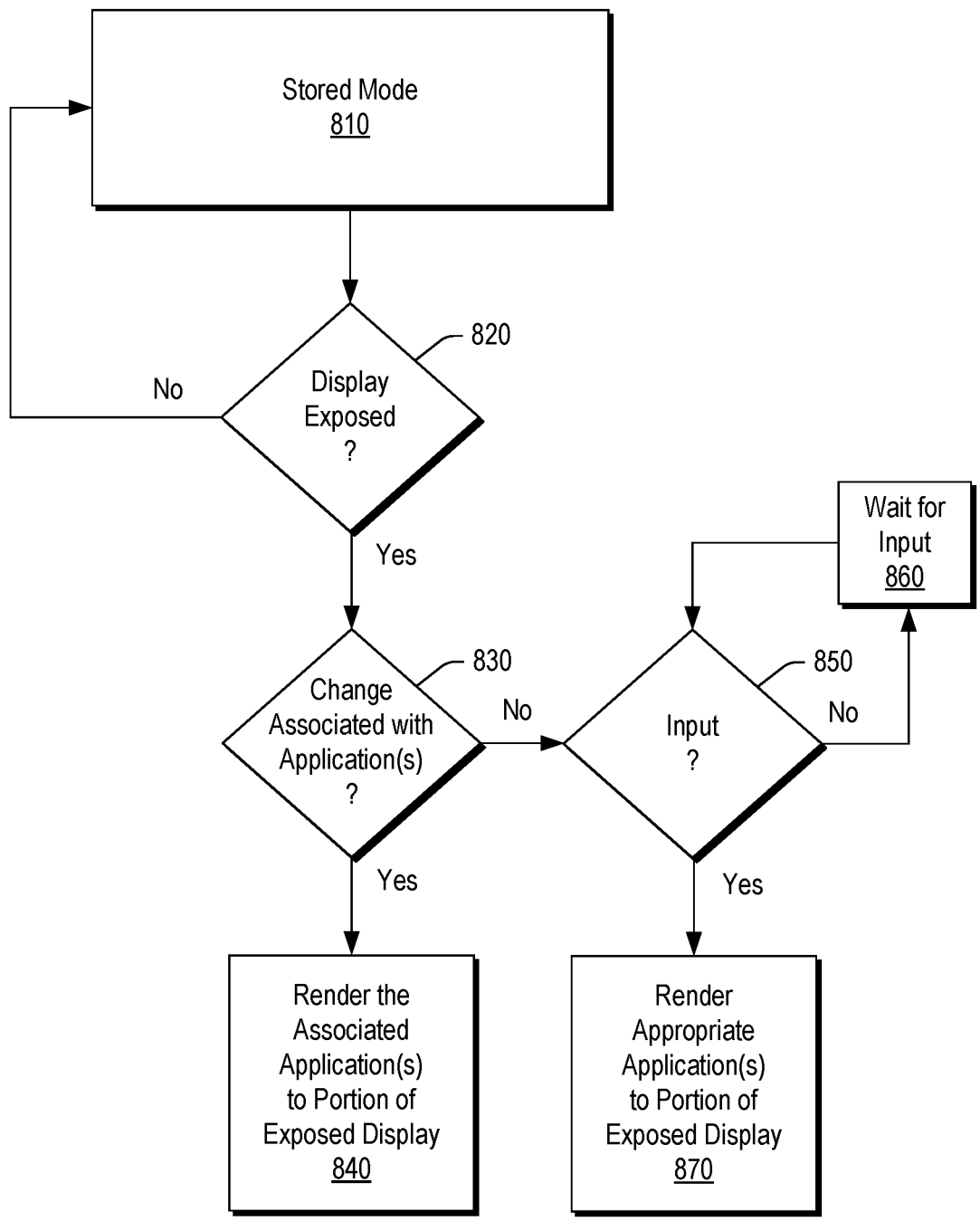
FIG. 8 is a diagram of an example of a method.

FIG. 8 shows an example of a method 800 that includes a storage block 810 for indicating that a tablet display device, which may be a tablet computer, is in a stored mode without a display thereof exposed, a decision block 820 for deciding whether at least a portion of the display is exposed, a decision block 830 following a "Yes" branch for deciding whether a change in position of the exposed display has occurred that is associated with one or more applications, and a render block 840 following a "Yes" branch for rendering the one or more applications to a portion of the exposed display. For example, whether a portion of a display is exposed or not and a change in position is detected, if that change is associated with one or more applications, circuitry can render content, one or more GUIs, etc., of one or more applications to a portion of the display, which can be a changed portion of the display (e.g., a change in size, a change in orientation, etc.). If a change causes a display to not be exposed (e.g., positioned within a recess such that the display is not exposed), a method can include performing one or more actions such as, for example, closing an application, etc.

In the example method 800 of FIG. 8, if the decision block 830 decides that a change is not associated with one or more applications, another decision block 850 following a "No" branch can decide whether input is received, which may be input from a human input device (HID), which may be from the exposed portion of the display (e.g., as a touch-screen display). In such an example, where the decision block 850 decides that input is received, following in a "Yes" branch, a render block 870 can render one or more appropriate applications to at least a portion of the exposed display. For example, consider a desktop icon that may be rendered to the exposed display and/or rendered to a primary display. In such an example, a user may select and actuate the desktop icon to launch (e.g., instantiate) an application that can provide content, one or more GUIs, etc., that can be rendered to at least a portion of the exposed display. As shown, the decision block 850 may follow a "No" branch to a wait block 860 that waits for input. For example, an exposed portion of a display may be blank, a desktop, etc., where rendering occurs responsive to appropriate input.

As an example, upon positioning of a tablet display device to expose at least a portion of the tablet display device, an operating system may call for rendering a desktop to the exposed portion of the tablet display device. In such an example, the desktop may be dynamically rendered in a manner that depends on how much of the display is exposed. For example, if the desktop includes icons, the icons may be dynamically arranged such that all of the icons are rendered regardless of how much of the display is exposed. In such an example, circuitry may control one or more of size, packing, etc., of the icons to assure that all of the icons are visibly rendered.

Figure 9:
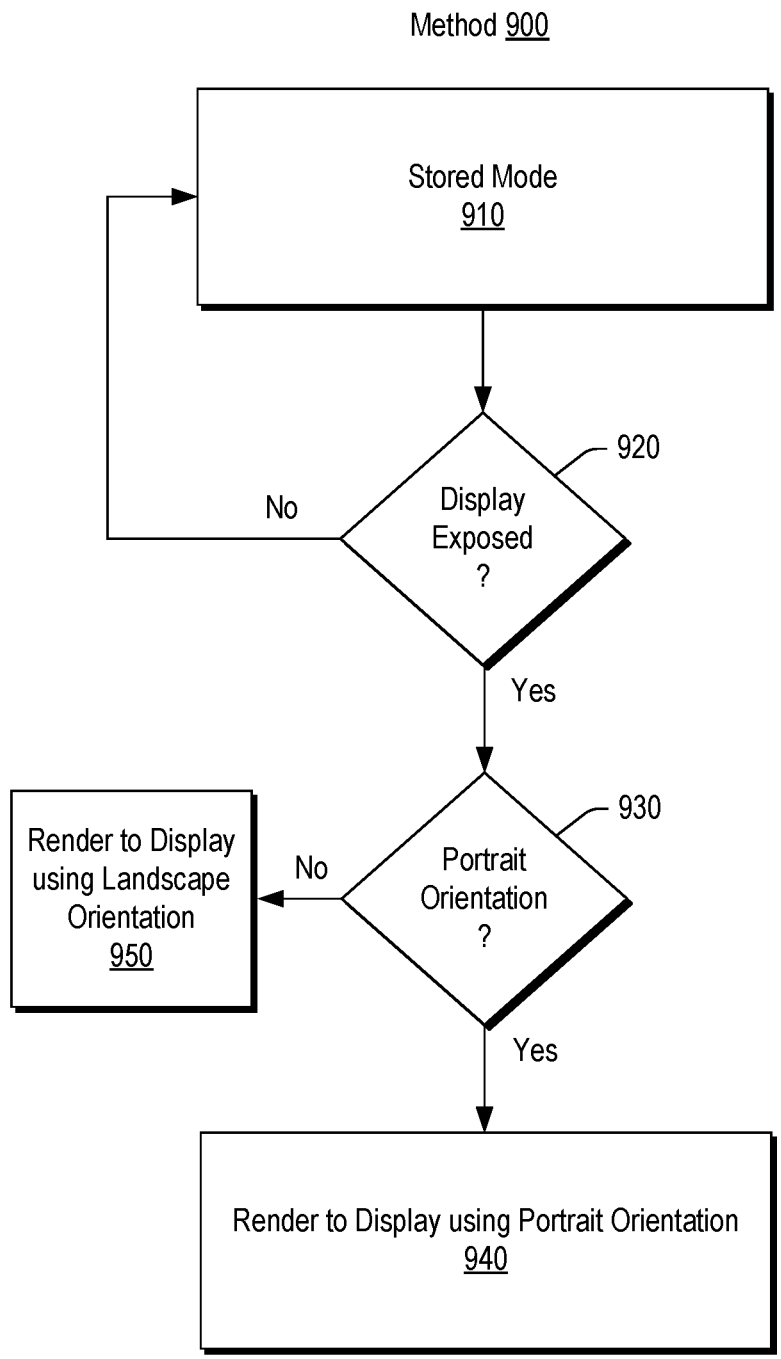
FIG. 9 is a diagram of an example of a method.

FIG. 9 shows an example of a method 900 that includes a storage block 910 for indicating that a tablet display device, which may be a tablet computer, is in a stored mode without a display thereof exposed, a decision block 920 for deciding whether at least a portion of the display is exposed, a decision block 930 following a "Yes" branch for deciding whether the tablet display device is in a portrait orientation or a landscape orientation, and a render block 940 following a "Yes" branch for rendering to the exposed display using a portrait orientation. As shown, a "No" branch of the decision block 930 can indicate that the tablet display device is in a landscape orientation where a render block 950 can provide for rendering to the exposed display using a landscape orientation.

Figure 10:
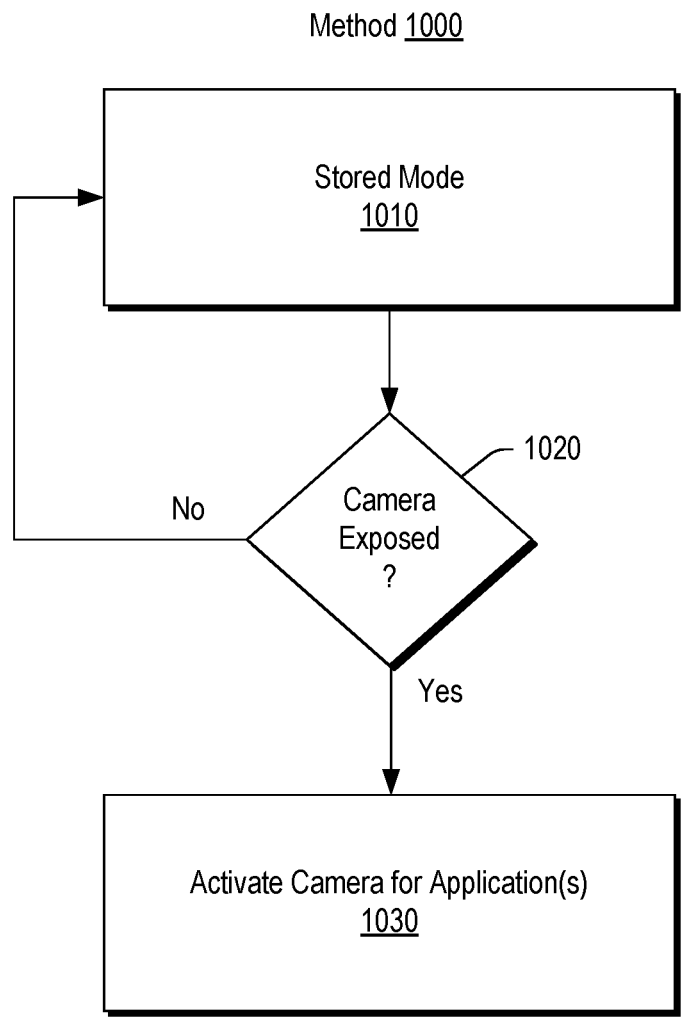
FIG. 10 is a diagram of an example of a method.

FIG. 10 shows an example of a method 1000 that includes a storage block 1010 for indicating that a tablet display device, which may be a tablet computer, is in a stored mode without a display thereof exposed, a decision block 1020 for deciding whether a camera of the tablet display device is exposed, and an activation block 1030 following a "Yes" branch for activating the exposed camera for use by one or more applications. As shown, a "No" branch of the decision block 1020 may continue to the stored block 1010.

In the example of FIG. 10, the camera may act as a sensor that can determine whether it is exposed or not. For example, the camera may be operatively coupled to circuitry that can act as a trigger where a change in light intensity occurs. In such an example, the camera may be in a monitoring state that is not an active state for use of the camera by one or more applications. In such an example, the monitoring state may be a low power state. In such an example, if the camera receives no light or a low level of light as a baseline and a change with respect to time does not occur (e.g., above a level of noise, a predetermined threshold, etc.), the camera may remain in the monitoring state. However, where a change does occur sufficient to trigger activation, the circuitry can call for a transition of the camera to an active state suitable for use with one or more applications, which may, for example, be a default application such that imagery captured by the camera is rendered to a display upon activation. For example, consider a videoconferencing application that may be instantiated upon exposure of the camera where a user's face captured by the exposed camera may be rendered to a display (e.g., a display of the tablet display device or a primary display).

Figure 11:
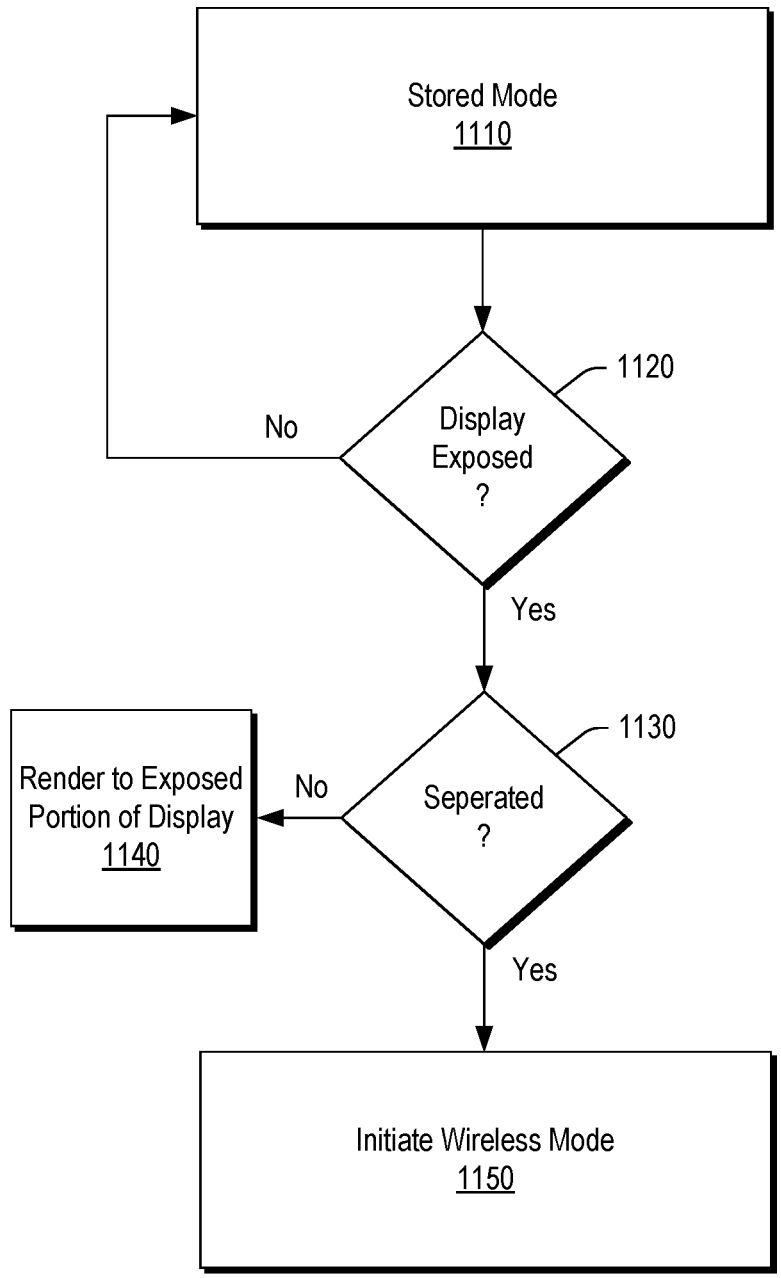
FIG. 11 is a diagram of an example of a method.

FIG. 11 shows an example of a method 1100 that includes a storage block 1110 for indicating that a tablet display device, which may be a tablet computer, is in a stored mode without a display thereof exposed, a decision block 1120 for deciding whether at least a portion of the display is exposed, a decision block 1130 following a "Yes" branch for deciding whether the tablet display device is physically separated from a clamshell computer, and an initiation block 1150 following a "Yes" branch for initiating a wireless mode of the tablet display device. As shown, following a "No" branch, a render block 1140 may provide for rendering to the exposed portion of the display of the tablet display device where the tablet display device is not separated and not operating in a wireless mode. The method 1100 may provide for a wired mode of operation where the tablet display device is not separated and provide for a wireless mode of operation where the tablet display device is separated. As explained, a wired mode of operation of a tablet display device and a clamshell computer may utilize one or more types of electrical contacts that provide for transmission and/or receipt of one or more of power and data.

Figure 12:
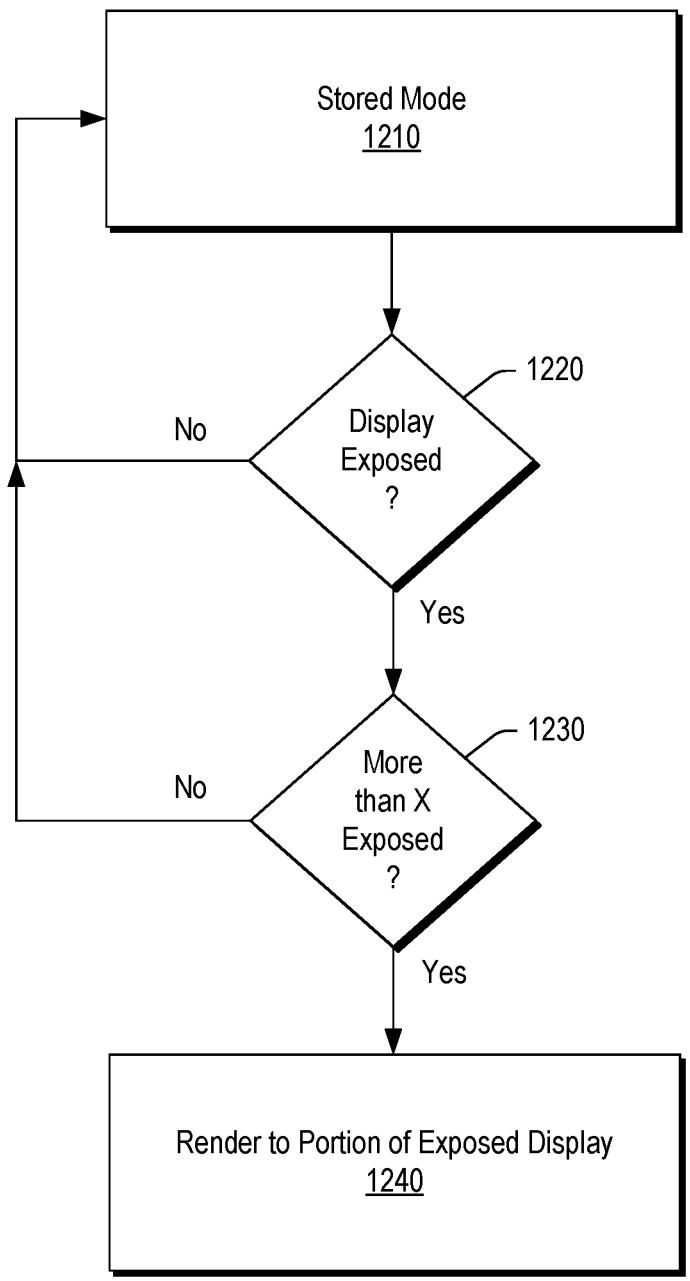
FIG. 12 is a diagram of an example of a method.

FIG. 12 shows an example of a method 1200 that includes a storage block 1210 for indicating that a tablet display device, which may be a tablet computer, is in a stored mode without a display thereof exposed, a decision block 1220 for deciding whether at least a portion of the display is exposed, a decision block 1230 following a "Yes" branch for deciding whether more than a predetermined portion of the display is exposed (e.g., X, being a distance, a fraction, a percentage, etc.), and a render block 1240 following a "Yes" branch for rendering to at least a portion of the exposed display. In such an example, where the exposed portion is less than a predetermined size, dimension, etc., a decision may be made to not render to the exposed portion; whereas, if the exposed portion is greater than the predetermined size, dimension, etc., then rendering may occur. For example, a user may position a tablet display device in a manner whereby a portion is exposed that is sufficient for gripping between a thumb and forefinger where such a position may correspond to a "ready" state where nothing is rendered to the display and/or the display is inactive (e.g., a no power or a low power state). Upon the user transitioning the tablet display device such that a larger portion is exposed, circuitry can call for rendering content, GUI(s), etc., to the exposed portion of the display. As explained with respect to FIG. 4, where a portion of a tablet display device is exposed in a stored mode, the portion may be utilized for rendering a virtual bezel. In such an example, where the method 1200 operates, the predetermined portion may correspond to a virtual bezel portion where, if the tablet display device is exposed more than the virtual bezel portion, rendering can occur where such rendering can be associated with an application (e.g., useful information associated with the application; whereas a virtual bezel may be a graphic that mimics an actual bezel).

Figure 13:
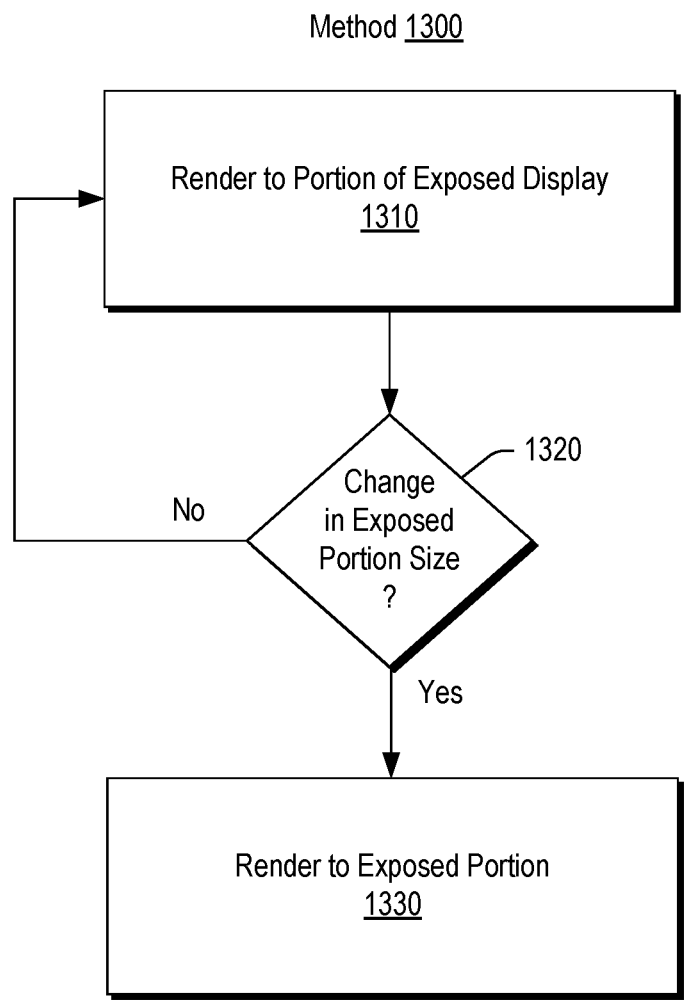
FIG. 13 is a diagram of an example of a method.

FIG. 13 shows an example of a method 1300 that includes a render block 1310 for rendering to an exposed portion of a display of a tablet display device, a decision block 1320 for deciding if a change has occurred or is occurring in the exposed portion side, and a render block 1330 following a "Yes" branch for rendering to the exposed portion according to its changed portion size. As shown, if the decision block 1320 decides that a change has not occurred or is not occurring, per a "No" branch, the method 1300 can continue to the render block 1310.

Figure 14:
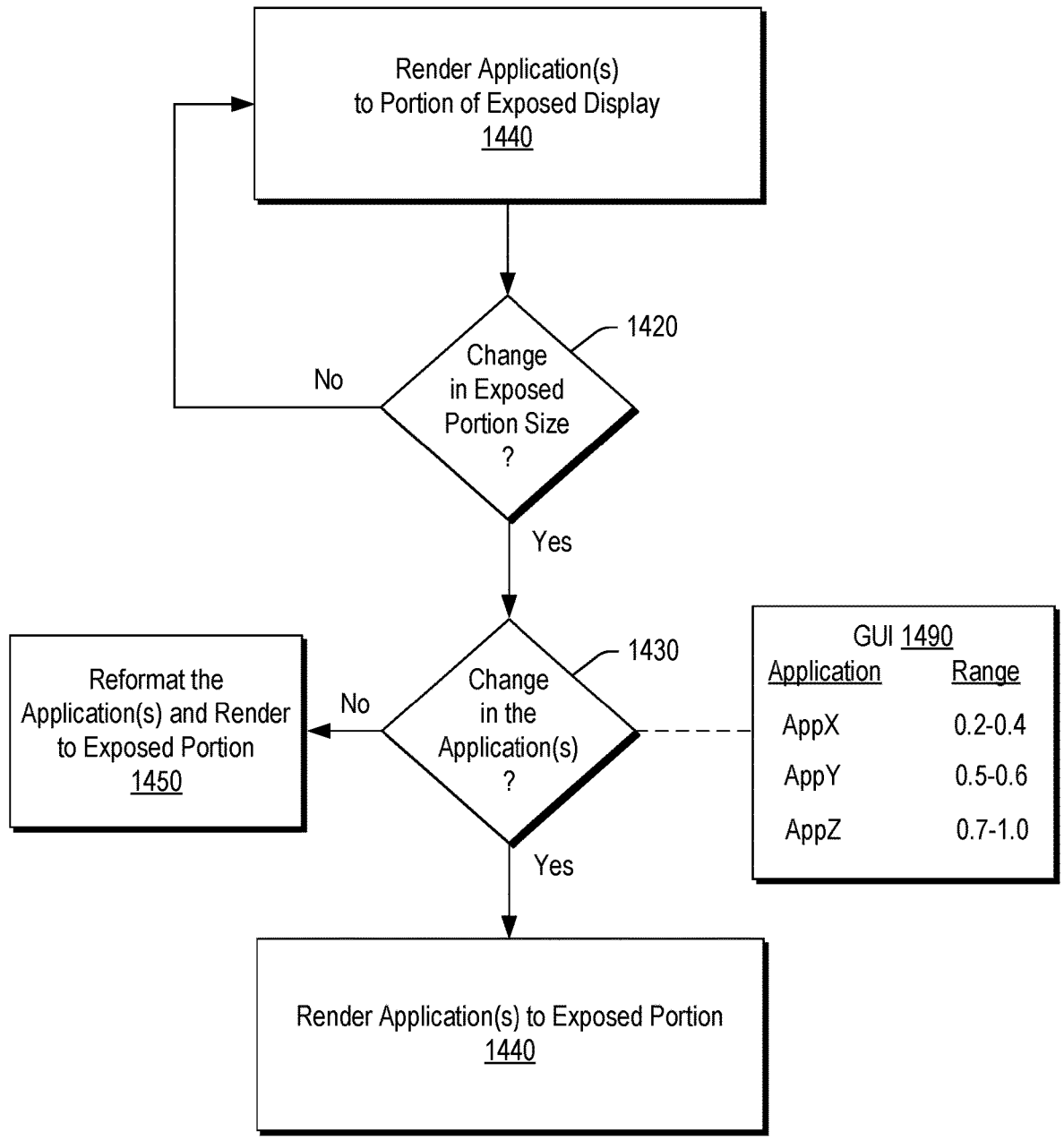
FIG. 14 is a diagram of an example of a method and an example of a graphical user interface.

FIG. 14 shows an example of a method 1400 that includes a render block 1410 for rendering to as appropriate for an application or applications to an exposed portion of a display of a tablet display device, a decision block 1420 for deciding if a change has occurred or is occurring in the exposed portion side, a decision block 1430 following "Yes" branch for deciding whether a change in an application or applications is associated with the change, and a render block 1440 following a "Yes" branch for rendering as appropriate for the application or applications. For example, a user may position a tablet display device with respect to a clamshell computer to trigger a change from one application to another application. In such an example, different positions may be associated with different applications. As shown, if the decision block 1430 decides that a change in an application or applications, then following a "No" branch, the method 1300 can continue in a reformatting block 1450 for reformatting for rendering for the application or applications to the exposed portion according to its changed portion size. In such an example, one or more applications may be executable for rendering over a wide range of exposed portions of a tablet display device; whereas, one or more other applications may be executable for specific exposed portions or narrow ranges of exposed portions. As an example, where an exposed portion is "outside" of a range associated with an application, a change may occur such as closing the application and optionally instantiating another, different application.

As shown in the example of FIG. 14, if the decision block 1420 decides that a change has not occurred or is not occurring, per a "No" branch, the method 1400 can continue to the render block 1410.

As an example, a graphical user interface (GUI) 1490 may provide for associating applications with ranges. In such an example, the GUI 1490 may provide for interactions with a data structure such as a table that includes values to indicate conditions, criteria, etc., that can cause instantiating an application, closing an application, etc. For example, when a user positions a tablet display device such that an exposed portion of a display thereof is within a normalized range position of 0.2 to 0.4, AppX may be instantiated and/or otherwise information associated therewith may be rendered to the exposed portion of the display of the tablet display device. In such an example, positioning of the tablet display device can provide for selecting an application, deselecting an application, transitioning from one application to another application, etc.

As mentioned, a system may utilize one or more APIs. As an example, the GUI 1490 may provide for control of one or more API calls and/or actions in response thereto. For example, an API call may be based at least in part on a position signal (e.g., directly and/or indirectly). As an example, a sensor may be operable using one or more API calls. For example, consider circuitry that issues one or more API calls to determine a sensor status, to receive a sensor signal, etc. As an example, an API may be an operating system API, a device API, a component API, an application API, etc. As an example, a framework such as graphics framework may be utilized for control of rendering. For example, consider one of the OpenGL frameworks (e.g., OpenGL ES, etc.), the METAL framework (Apple Inc., Cupertino, Calif.), etc.

As an example, consider one or more APIs of a WINDOWS operating system (e.g., desktop, mobile, server, etc.).

As an example, an API may provide for various windows controls functions (e.g., via one or more of commctrl.h, commoncontrols.h, dpa_dsa.h, prsht.h, richedit.h, richole.h, shlobj.h, textserv.h, tom.h, uxtheme.h, windowsx.h, and winuser.h). As an example, an API can include a sizing function such as, for example, an AdjustWindowRectEx function that can calculate the required size of a window rectangle based on a desired size of a client rectangle. In such an example, a window rectangle can then be passed to the CreateWindowEx function to create a window with a client area of the desired size.

As an example, an API can include a variety of functions such as, for example, functions to create one or more GUIs, close one or more GUIs (e.g., minimize but not destroy, etc.), cascade GUIs (e.g., CascadeWindows), etc.

As an example, a method may utilize one or more features for a child window function. For example, consider utilizing one or more features of a BCM_GETIDEALSIZE message, which includes a pointer to a size structure that receives a desired size of a button as a child window, including text and image list, if present. In such an example, a calling application can be responsible for allocating this structure. In such an example, parameters or members cx and cy can be utilized. For example, where a position signal may act to set a cx member to a desired width such that circuitry can calculate a height for the width and return it in as a value of the cy member.

As an example, an exposed area of a display of a tablet display device may be considered an area for which an x member is known through use of a sensor and a y member is known as being fixed (e.g., in a portrait orientation and vice versa in a landscape orientation). Such members may be utilized to instruct circuitry to render an appropriately size GUI or GUIs to the exposed area. For example, consider receiving a sensor position signal and automatically resizing a GUI or other content (e.g., a window, etc.) based at least in part on the sensor position signal. As an example, a method can include receiving multiple sensor signals, where one may be an orientation signal (e.g., an accelerometer, etc.) that can be utilized to determine whether a tablet display device is in a portrait orientation or a landscape orientation and where another may be a position signal that can determine an exposed amount of a display of the tablet display device. In such an example, rendering may be based on both sensor signals.

As an example, a tablet computer or tablet display device can various types of circuitry, such as, for example, one or more of an LED-backlit display (e.g., consider 2048×1536 resolution (326 ppi), etc.), a touchscreen controller (e.g., BCM15900, etc.), a system on a chip (SoC) (e.g., consider an ARM multi-core CPU and one or more core graphics processing unit (GPU)), etc.

Figure 15:
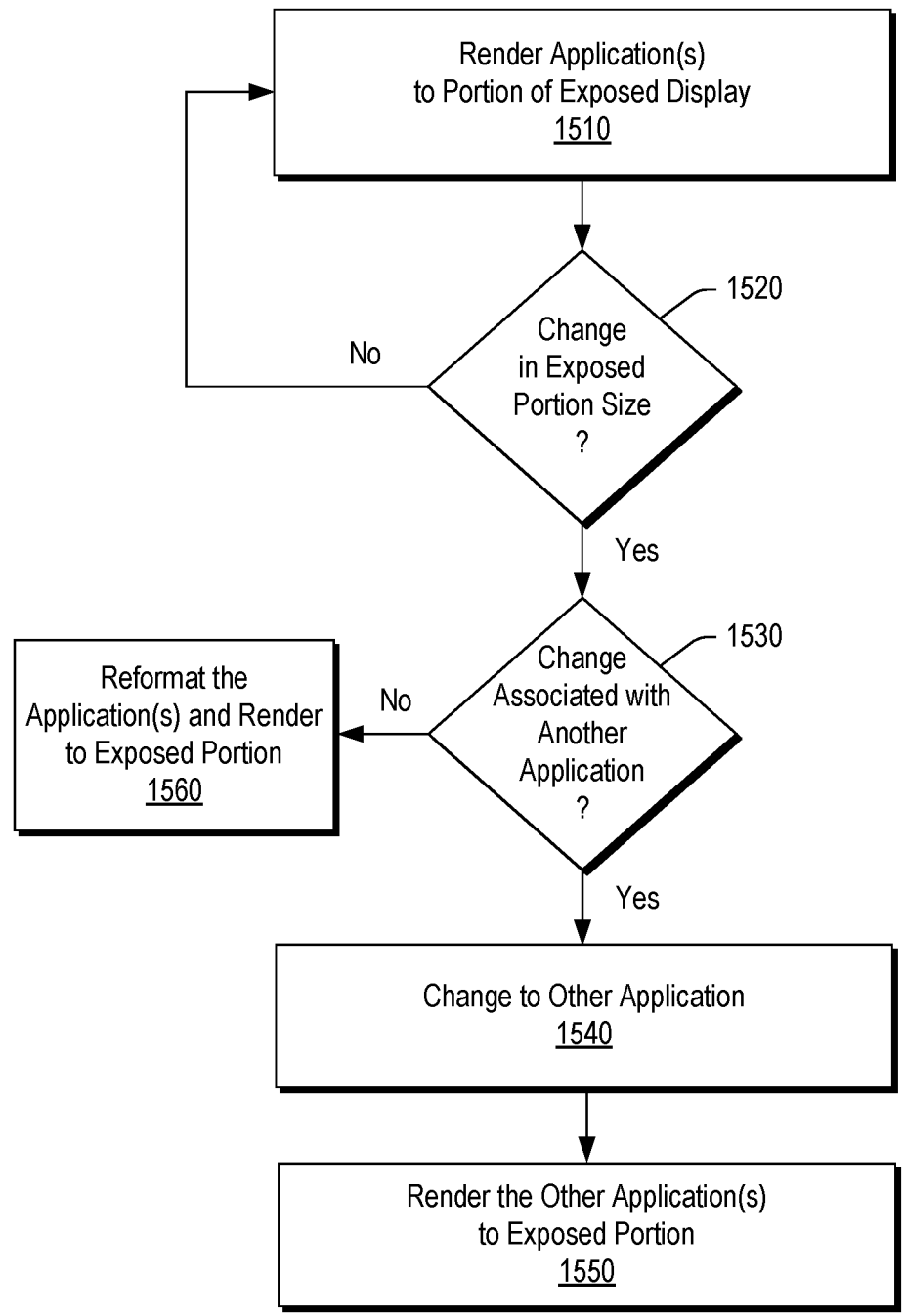
FIG. 15 is a diagram of an example of a method.

FIG. 15 shows an example of a method 1500 that includes a render block 1510 for rendering to as appropriate for an application or applications to an exposed portion of a display of a tablet display device, a decision block 1520 for deciding if a change has occurred or is occurring in the exposed portion side, a decision block 1530 following "Yes" branch for deciding whether a change is associated with another application, a change block 1540 following a "Yes" branch for changing to the other application, and a render block 1550 for rendering as appropriate for the other application. In such an example, a data structure may be utilized that can associate a change with an application. For example, consider the GUI 1490 of FIG. 14, which may include one or more other criteria such as landscape and portrait. In such an approach, a change in an exposed portion may be a change from a portrait orientation to a landscape orientation or vice versa.

As shown in FIG. 15, if the decision block 1530 decides "No", then the method 1500 may continue in a render block 1560 for reformatting the application and rendering to the exposed portion as changed in size. As shown, if the decision block 1520 decides "No", then the method 1500 may continue at the render block 1510.

As an example, a system can include a processor; memory accessible to the processor; a first display housing that includes a first display, a first display surface and a recess; a second display housing that includes a second display, a second display surface, where the second display housing is translatable at least partially out of the recess to expose at least a portion of the second display surface adjacent to the first display surface; a sensor that generates a position signal for position of the second display; and circuitry that controls rendering of information to the second display based at least in part on the position signal.

In such an example, the second display and/or the first display can include a sensor or at least a portion of a sensor. As an example, a sensor may be a non-contact sensor. For example, consider a non-contact sensor that utilizes one or more of a magnet, an emitter, a detector, etc. As an example, a non-contact sensor can utilize at least one electromagnetic energy detector. As an example, a sensor may use a light guide that carries light to a sensor. As an example, a sensor can be a contact sensor. For example, consider an electrical contact sensor.

As an example, a first display housing can include a first interface for transmission of information and a second display housing can include a second interface for reception of the information. In such an example, the first interface and the second interface can be electrical contact interfaces, which may, for example, at least in part overlap where such overlap may correspond to a position of the second display housing. As an example, a first interface and a second interface can be wireless interfaces.

As an example, a recess of a first display housing can include a translation guide. For example, consider a second display housing that includes an edge that cooperates with the translation guide. As explained, second display housing may include a component that cooperates with a translation guide.

As an example, a position of a second display housing with respect to a first display housing may provide a standard video aspect ratio for a combined display area of a first display surface and an exposed portion of a second display surface.

As an example, a position signal may correspond to an aspect ratio of a graphical user interface renderable to an exposed portion of a second display surface of a second display housing that is exposed at least in part from a recess of a first display housing. In such an example, the graphical user interface can include control graphics for control of rendering media to a first display surface of the first display housing.

As an example, circuitry may render at least one graphical user control to an exposed portion of a second display surface for control of an application executable to render content to a first display surface. For example, consider a videoconferencing application that can render video to the first display surface and that can render one or more tools as graphical controls to the second display surface. As another example, consider a drawing application, a photo editing application, etc., where particular content can be rendered to the first display surface and where one or more GUIs with tools may be rendered to the second display surface. In such an example, a tool may be a drawing tool such as a pencil tool, a pen tool, an eraser tool, etc.

As an example, a second display housing can be receivable at least in part in a recess of a first display housing in a portrait orientation and in a landscape orientation. For example, consider removing the second display housing, rotating it by 90 degrees and inserting it at least in part in the recess. As an example, a sensor can generate a position signal that can be indicative of a portrait orientation or a landscape orientation.

As an example, a system can include a keyboard housing that includes a keyboard and a hinge assembly that operatively couples a first display housing to the keyboard housing.

As an example, a system can include a free state of a second display housing and a first display housing where the second display housing is completely removed from a recess of the first display housing. In such an example, the free state can include a wireless communication mode that utilizes a first wireless interface of the first display housing and a second wireless interface of the second display housing. As an example, a system may include a tethered state where a cable electronically couples a first display housing and a second display housing.

As an example, a second display housing can include touch-screen circuitry, where the touch-screen circuitry controls a touch-sensitive region depending on how much the second display housing is exposed from a recess of the first display housing.

As an example, a system can include circuitry that controls rendering of a virtual bezel to a first display surface and/or a second display surface. For example, consider a recess of a first display housing that includes an open side, where the virtual bezel is renderable along a side of the second display surface that corresponds to the open side and where the virtual bezel matches a physical bezel along an opposing side of the second display surface. In such an example, responsive to a transition to a continuous display mode of the first display surface and an exposed portion of the second display surface, the circuitry may halt rendering of the virtual bezel or, for example, render another virtual bezel, which may be a lower bezel (e.g., to form a virtual bezel that includes an L-shape). As an example, circuitry may render a virtual bezel to a first display surface of a first display housing, for example, adjacent to an open side of a recess of the first display housing where the recess can receive a second display housing.

As an example, a recess of a first display housing can include at least one open side. In such an example, a second display housing may be translatable in two orthogonal directions (e.g., up and to the side).

As an example, a second display housing can include a camera. In such an example, the camera may be activated responsive to translation of the second housing (e.g., by a predefined activation distance) at least partially out of a recess of a first display housing. In such an example, the camera may be activated for use by a video conferencing application. As an example, a translation may activate a videoconferencing application along with a camera.

As an example, a first display housing can include an opening where a camera of a second display housing may be aligned with the opening. In such an example, the camera may be activated for use, optionally in addition to one or more other cameras. As an example, an opening can be a slot such that the camera is aligned with the slot over a range of positions of the second display housing in a recess of the first display housing.

As an example, a system can include activation circuitry that instantiates an application responsive to translation of a second display housing with respect to a recess of a first display housing.

As an example, a system can include a first processor of a first display housing and a second processor of a second display housing where, for example, the first processor executes a first operating system to establish a first operating system environment and the second processor executes a second operating system to establish a second operating system environment.

As an example, a second display housing can be a smartphone. For example, consider a second display housing that includes cellular circuitry (e.g., 4G, 5G, etc.).

As an example, a system can include circuitry that can mimic a smartphone. For example, consider circuitry that can call for rendering of one or more GUIs to a second display surface of a second display housing that can be translated at least in part out of a recess of a first display housing. In such an example, the circuitry may simulate the smartphone where the circuitry is operatively coupled, wirelessly, to a smartphone or, for example, the smartphone may be plugged into a port of the system using a cable (e.g., a USB cable, etc.).

As an example, a system can include charging circuitry that charges a rechargeable battery of one or more display housings.

As an example, a method can include, in a system that includes a first display housing with a first display having a first display surface and a second display housing with a second display having a second display surface, controlling rendering of information to the second display of the second display housing responsive to translation of the second display housing in a recess of the first display housing that exposes at least a portion of the second display surface adjacent to the first display surface. In such an example, the method can include receiving sensor information by a sensor that generates a position signal for position of the second display where the controlling controls rendering based at least in part on the position signal.

As an example, one or more computer-readable storage media can include processor-executable instructions to instruct a computing system to: control rendering of information to a second display of a second display housing responsive to translation of the second display housing in a recess of a first display housing, where the translation exposes at least a portion of a second display surface of the second display adjacent to a first display surface of the first display.

As an example, a tablet display device, which may be a tablet computer, may include two displays. For example, consider a front display and a back display where circuitry may respond to orientation of the tablet display device in a recess of a clamshell computer to determine which of the two displays is to be utilized.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 16:
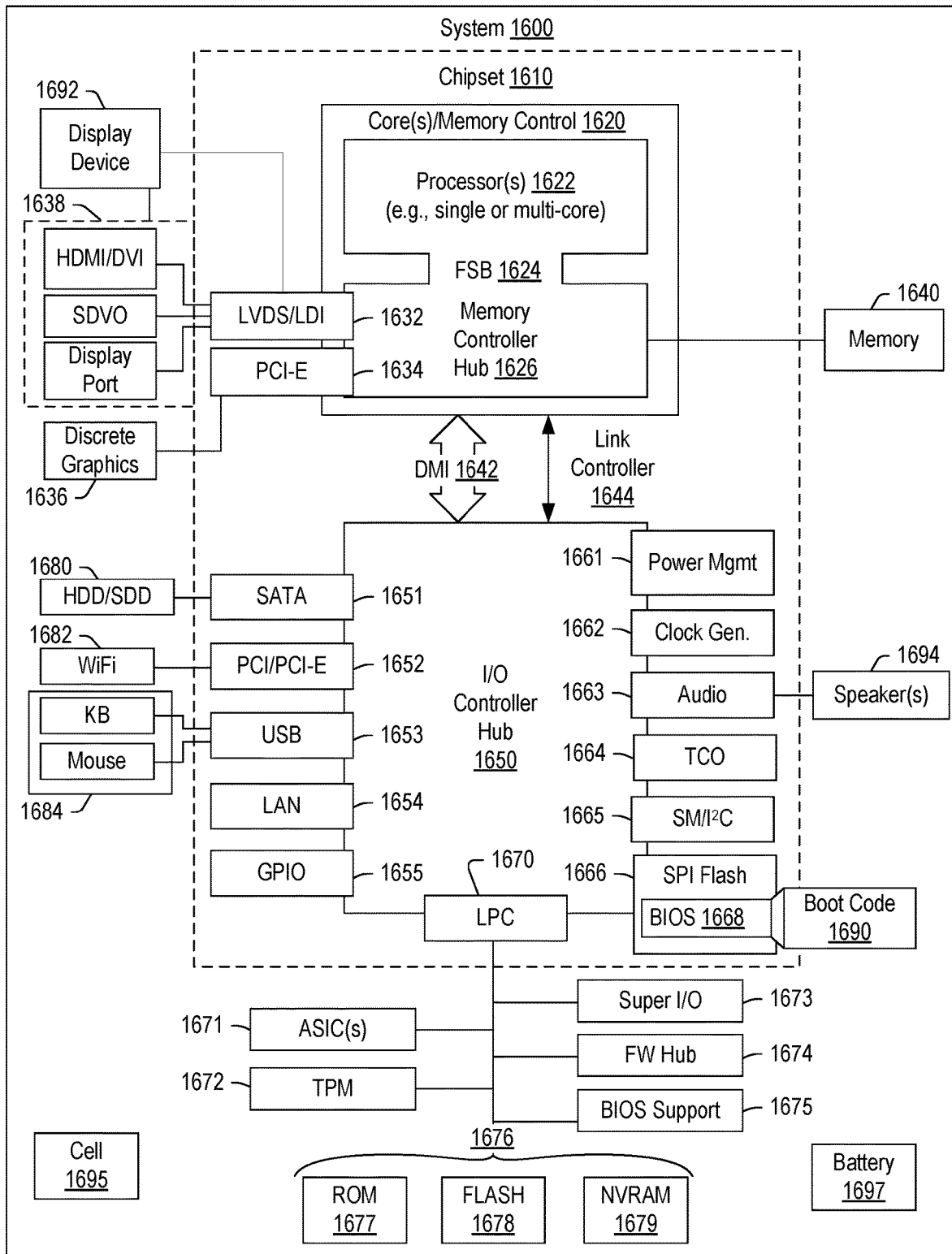
FIG. 16 is a diagram of an example of a system that includes one or more processors.

While various examples of circuits or circuitry have been discussed, FIG. 16 depicts a block diagram of an illustrative computer system 1600. The system 1600 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 1600. As an example, a system such as the system 100 of FIG. 1 may include at least some of the features of the system 1600.

As shown in FIG. 16, the system 1600 includes a so-called chipset 1610. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 16, the chipset 1610 has a particular architecture, which may vary to some extent depending on brand or manufacturer. The architecture of the chipset 1610 includes a core and memory control group 1620 and an I/O controller hub 1650 that exchange information (e.g., data, signals, commands, etc.) via, for example, a direct management interface or direct media interface (DMI) 1642 or a link controller 1644. In the example of FIG. 16, the DMI 1642 is a chip-to-chip interface (sometimes referred to as being a link between a "northbridge" and a "southbridge").

The core and memory control group 1620 include one or more processors 1622 (e.g., single core or multi-core) and a memory controller hub 1626 that exchange information via a front side bus (FSB) 1624. As described herein, various components of the core and memory control group 1620 may be integrated onto a single processor die, for example, to make a chip that supplants the conventional "northbridge" style architecture.

The memory controller hub 1626 interfaces with memory 1640. For example, the memory controller hub 1626 may provide support for DDR SDRAM memory (e.g., DDR, DDR2, DDR3, etc.). In general, the memory 1640 is a type of random-access memory (RAM). It is often referred to as "system memory".

The memory controller hub 1626 further includes a low-voltage differential signaling interface (LVDS) 1632. The LVDS 1632 may be a so-called LVDS Display Interface (LDI) for support of a display device 1692 (e.g., a CRT, a flat panel, a projector, etc.). A block 1638 includes some examples of technologies that may be supported via the LVDS interface 1632 (e.g., serial digital video, HDMI/DVI, display port). The memory controller hub 1626 also includes one or more PCI-express interfaces (PCI-E) 1634, for example, for support of discrete graphics 1636. Discrete graphics using a PCI-E interface has become an alternative approach to an accelerated graphics port (AGP). For example, the memory controller hub 1626 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1650 includes a variety of interfaces. The example of FIG. 16 includes a SATA interface 1651, one or more PCI-E interfaces 1652 (optionally one or more legacy PCI interfaces), one or more USB interfaces 1653, a LAN interface 1654 (more generally a network interface), a general purpose I/O interface (GPIO) 1655, a low-pin count (LPC) interface 1670, a power management interface 1661, a clock generator interface 1662, an audio interface 1663 (e.g., for speakers 1694), a total cost of operation (TCO) interface 1664, a system management bus interface (e.g., a multi-master serial computer bus interface) 1665, and a serial peripheral flash memory/controller interface (SPI Flash) 1666, which, in the example of FIG. 16, includes BIOS 1668 and boot code 1690. With respect to network connections, the I/O hub controller 1650 may include integrated gigabit Ethernet controller lines multiplexed with a PCI-E interface port. Other network features may operate independent of a PCI-E interface.

The interfaces of the I/O hub controller 1650 provide for communication with various devices, networks, etc. For example, the SATA interface 1651 provides for reading, writing or reading and writing information on one or more drives 1680 such as HDDs, SDDs or a combination thereof. The I/O hub controller 1650 may also include an advanced host controller interface (AHCI) to support one or more drives 1680. The PCI-E interface 1652 allows for wireless connections 1682 to devices, networks, etc. The USB interface 1653 provides for input devices 1684 such as keyboards (KB), one or more optical sensors, mice and various other devices (e.g., microphones, cameras, phones, storage, media players, etc.). On or more other types of sensors may optionally rely on the USB interface 1653 or another interface (e.g., I²C, etc.). As to microphones, the system 1600 of FIG. 16 may include hardware (e.g., audio card) appropriately configured for receipt of sound (e.g., user voice, ambient sound, etc.).

In the example of FIG. 16, the LPC interface 1670 provides for use of one or more ASICs 1671, a trusted platform module (TPM) 1672, a super I/O 1673, a firmware hub 1674, BIOS support 1675 as well as various types of memory 1676 such as ROM 1677, Flash 1678, and non-volatile RAM (NVRAM) 1679. With respect to the TPM 1672, this module may be in the form of a chip that can be used to authenticate software and hardware devices. For example, a TPM may be capable of performing platform authentication and may be used to verify that a system seeking access is the expected system.

The system 1600, upon power on, may be configured to execute boot code 1690 for the BIOS 1668, as stored within the SPI Flash 1666, and thereafter processes data under the control of one or more operating systems and application software (e.g., stored in system memory 1640). An operating system may be stored in any of a variety of locations and accessed, for example, according to instructions of the BIOS 1668. Again, as described herein, a satellite, a base, a server or other machine may include fewer or more features than shown in the system 1600 of FIG. 16. Further, the system 1600 of FIG. 16 is shown as optionally include cell phone circuitry 1695, which may include GSM, CDMA, etc., types of circuitry configured for coordinated operation with one or more of the other features of the system 1600. Also shown in FIG. 16 is battery circuitry 1697, which may provide one or more battery, power, etc., associated features (e.g., optionally to instruct one or more other components of the system 1600). As an example, a SMBus may be operable via a LPC (see, e.g., the LPC interface 1670), via an I²C interface (see, e.g., the SM/I²C interface 1665), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
    a processor;
    memory accessible to the processor;
    a first display housing that comprises a first display, a first display surface and a recess;
    a second display housing that comprises a second display, a second display surface, wherein the second display housing is translatable at least partially out of the recess to expose at least a portion of the second display surface adjacent to the first display surface, wherein the second display housing is receivable at least in part in the recess in a portrait orientation and in a landscape orientation, wherein the first display housing comprises four edges that define a first rectangle, wherein the second housing comprises four edges that define a second rectangle, and wherein each of the four edges of the second display housing is shorter than a shortest edge of the four edges of the first display housing such that the second rectangle defines an area that is less than an area of the first rectangle;
    a sensor that generates a position signal for position of the second display, wherein the position signal is indicative of the portrait orientation or is indicative of the landscape orientation; and
    circuitry that controls rendering of information to the second display based at least in part on the position signal.

2. The system of claim 1, wherein the recess comprises a translation guide.

3. The system of claim 2, wherein the second display housing comprises a component that cooperates with the translation guide.

4. The system of claim 1, wherein the position signal corresponds to a standard video aspect ratio for a combined display area of the first display surface and the exposed portion of the second display surface.

5. The system of claim 1, wherein the circuitry controls rendering of a virtual bezel to the second display surface.

6. The system of claim 5, wherein the recess comprises an open side, wherein the virtual bezel is renderable along a side of the second display surface that corresponds to the open side and wherein the virtual bezel matches a physical bezel along an opposing side of the second display surface.

7. The system of claim 1, comprising a keyboard housing that comprises a keyboard, a hinge assembly that operatively couples the first display housing to the keyboard housing.

8. The system of claim 1, wherein the recess comprises at least one open side.

9. The system of claim 8, wherein the second display housing is translatable in two orthogonal directions.

10. The system of claim 1, wherein the second display housing comprises a camera.

11. The system of claim 10, wherein the camera is activated responsive to translation of the second housing.

12. The system of claim 10, wherein the first display housing comprises an opening wherein, in at least one position of the second display housing, the camera comprises an aperture that is aligned with the opening for image capture.

13. The system of claim 1, comprising activation circuitry that instantiates an application responsive to the translation of the second display housing.

14. The system of claim 1, wherein the processor is a first processor of the first display housing and further comprising a second processor of the second display housing, wherein the first processor executes a first operating system to establish a first operating system environment and wherein the second processor executes a second operating system to establish a second operating system environment.

15. The system of claim 1, wherein the information corresponds to mobile smartphone information that simulates a mobile smartphone wirelessly coupled to the second display housing.

16. A method comprising:
    in a system that comprises first display housing that comprises a first display, a first display surface and a recess; a second display housing that comprises a second display, a second display surface, wherein the second display housing is translatable at least partially out of the recess to expose at least a portion of the second display surface adjacent to the first display surface, wherein the second display housing is receivable at least in part in the recess in a portrait orientation and in a landscape orientation, wherein the first display housing comprises four edges that define a first rectangle, wherein the second housing comprises four edges that define a second rectangle, and wherein each of the four edges of the second display housing is shorter than a shortest edge of the four edges of the first display housing such that the second rectangle defines an area that is less than an area of the first rectangle; and a sensor that generates a position signal for position of the second display, wherein the position signal is indicative of the portrait orientation or is indicative of the landscape orientation, deciding whether the second display housing is in the portrait orientation or the landscape orientation and, based at least in part on the deciding, controlling rendering of information to the second display of the second display housing responsive to translation of the second display housing in the recess of the first display housing that exposes at least a portion of the second display surface adjacent to the first display surface.

17. One or more non-transitory computer-readable storage media comprising processor-executable instructions to instruct a computing system, that comprises a first display housing that comprises a first display, a first display surface and a recess; a second display housing that comprises a second display, a second display surface, wherein the second display housing is translatable at least partially out of the recess to expose at least a portion of the second display surface adjacent to the first display surface, wherein the second display housing is receivable at least in part in the recess in a portrait orientation and in a landscape orientation, wherein the first display housing comprises four edges that define a first rectangle, wherein the second housing comprises four edges that define a second rectangle, and wherein each of the four edges of the second display housing is shorter than a shortest edge of the four edges of the first display housing such that the second rectangle defines an area that is less than an area of the first rectangle; and a sensor that generates a position signal for position of the second display, wherein the position signal is indicative of the portrait orientation or is indicative of the landscape orientation, to:

make a determination as to whether the second display housing, in the recess of the first display housing, is in the portrait orientation or the landscape orientation; and based at least in part on the determination, control rendering of information to the second display of the second display housing responsive to translation of the second display housing in the recess of the first display housing, wherein the translation exposes at least a portion of the second display surface of the second display adjacent to the first display surface of the first display.

* * * * *